United States Patent
Urase et al.

(10) Patent No.: US 7,338,080 B2
(45) Date of Patent: Mar. 4, 2008

(54) TRUCK FRAME FOR CONSTRUCTION MACHINE

(75) Inventors: Kouhei Urase, Shiga (JP); Saori Sawai, Kosai (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 353 days.

(21) Appl. No.: 10/512,969

(22) PCT Filed: Sep. 30, 2003

(86) PCT No.: PCT/JP03/12547
§ 371 (c)(1),
(2), (4) Date: Oct. 29, 2004

(87) PCT Pub. No.: WO2004/033273
PCT Pub. Date: Apr. 22, 2004

(65) Prior Publication Data
US 2005/0167967 A1 Aug. 4, 2005

(30) Foreign Application Priority Data
Oct. 9, 2002 (JP) ............................. 2002-296477

(51) Int. Cl.
*B62D 24/00* (2006.01)

(52) U.S. Cl. ..................................................... 280/781

(58) Field of Classification Search ................ 280/781, 280/793, 794
See application file for complete search history.

(56) References Cited

U.S. PATENT DOCUMENTS

| 2,144,760 | A | * | 1/1939 | Harnischfeger | ............. 212/253 |
| 2,991,132 | A | * | 7/1961 | Schwartz et al. | ............. 305/60 |
| 4,231,699 | A | * | 11/1980 | Thompson | .................. 414/687 |
| 6,330,778 | B1 | * | 12/2001 | Jakobsson | .................. 52/729.1 |
| 7,204,518 | B2 | * | 4/2007 | Kubo et al. | ................. 280/781 |
| 7,204,519 | B2 | * | 4/2007 | Kubo et al. | ................. 280/781 |

FOREIGN PATENT DOCUMENTS

| JP | 62-59577 | | 4/1987 |
| JP | 06001260 | A * | 1/1994 |
| JP | 9-142337 | | 6/1997 |
| JP | 2002146831 | A * | 5/2002 |

* cited by examiner

*Primary Examiner*—Christopher P. Ellis
*Assistant Examiner*—Joseph Rocca
(74) *Attorney, Agent, or Firm*—Mattingly, Stanger, Malur & Brundidge, P.C.

(57) ABSTRACT

A vehicular body oscillating mechanism (31) is provided between a frame (3) of an automotive vehicular body (2) and a stabilizer (18) thereby to sway the vehicular body (2) arcuately in a rightward and/or leftward direction about a pivot point (A) between right and left rear wheels (6, 7) when the stabilizer (18) is set on the ground for a load handling operation. This means that, after the stabilizer (18) is set on the ground for a load handling operation, the vehicular body (2) can be swayed arcuately laterally in a rightward and/or leftward direction together with a load lifting mechanism (12). Therefore, in a load handling operation, the load lifting mechanism (12) can be adjusted in a lateral direction to dump lifted freight goods exactly on a specified unloading spot.

11 Claims, 19 Drawing Sheets

TRUCK FRAME FOR CONSTRUCTION MACHINE

TECHNICAL FIELD

This invention relates to a truck frame particularly suitable for use on a lower structure of a construction machines such as, for example, a hydraulic excavator or a hydraulic crane.

BACKGROUND ART

Generally, construction machines like hydraulic excavators, for example, are mounted on a crawler type vehicle or lower structure to ensure stabilized travels on mountainous or swampy terrains or other rough terrains.

As well known in the art (e.g., from Japanese Laid-Open Patent Application H9-142337), this sort of crawler type lower structures by prior art are equipped with a truck frame, including a center frame on which an upper structure is to be mounted, a left side frame located on the left side of the center frame and extended longitudinally toward front and rear ends, a right side frame located on the right side of the center frame and similarly extended longitudinally toward front and rear ends, and fore and hind legs which are arranged to connect the right and left side frames with the center frame.

In the case of the prior art just mentioned, a round girth member is provided on the center frame, and a left fore leg, a right fore leg, a left hind leg and a right hind leg to be extended in the shape of letter "X" from the round girth member are connected between the center frame and the right and left side frames. In this instance, the left fore leg is arranged in the form of a box-like structure, by the use of upper and lower plates which are extended from the center frame toward the left side frame in vertically confronting relation with each other, and front and rear plates which are located on the front and rear sides of the upper and lower plates and joined with the latter by welding along respective upper and lower side edges. Similarly to the left fore leg, the right fore leg, left hind leg, right hind leg are formed in the form of a box-like structure which is enclosed by upper, lower, front and rear plates on four sides.

However, in the case of the truck frame of the prior art mentioned above, the four legs are each constituted by four separate plate members, namely, by upper, lower, front and rear plate members. Therefore, in the course of fabricating the legs of the truck frame, it has been inevitably required to cut upper, lower, front and rear plates into specified shapes in the first place and then weld the front and rear plates to the upper and lower plates. These plate cutting and welding operations are required for each one of four leg portions, and are therefore necessarily reflected by an increased truck frame production cost.

Further, at the time of welding to the side frames the four leg portions which are provided integrally with the center frame, a fore end portion of each leg has to be cut off in preparation for forming a gapless butt joint between the fore end of the leg portion and a joint surface on the side of the side frame.

However, it is often the case that joint portions which are formed by welding fore ends of leg portions to a side frame after a cutting operation are found to be inferior in joint strength due to existence of gaps or interstices which are attributable to errors in the course of cutting operations.

DISCLOSURE OF THE INVENTION

In view of the above-discussed problems with the prior art, it is an object of the present invention to provide a truck frame for a construction machine, which is reduced in production cost and yet enhanced in joint strength between legs and side frames.

In accordance with the present invention, in order to achieve the above-stated objective, there is provided a truck frame for a construction machine, which includes a center frame for supporting an upper structure, right and left side frames extending toward fore and rear ends of the right and left sides of the center frame, respectively, and fore and hind legs provided on each side of the center frame to connect the right and left side frames to said the center frame.

The construction according to the present invention is characterized in that; the legs are constituted by an inner joint portion to be joined with the center frame by welding, an outer joint portion to be joined with the side frame by welding, and an intermediate tubular portion provided between the inner and outer joint portions; at least the inner joint portion on the side of the center frame or the outer joint portion on the side of a side frame is constituted by a flare tube gradually spread in diameter from the intermediate tubular portion toward an inner or outer joining end; and the flare tube is formed by a casting means using molten iron-base metal.

With the arrangements just described, at least either the inner joint portion or the outer joint portion of each leg is formed in the shape of a flare tube which is gradually spread toward a joining end. Therefore, it becomes possible to form a longer welding bead around the spread joining end and thus to enhance the joint strength. Further, in case a flare tube which is formed by the use of a casting means is employed for the inner joint portion on the side of the center frame, the inner joint portion can be assembled to butt against the center frame in a gapless state to form a strong joint therebetween. Moreover, in case a flare tube which is formed by the use of a casting means is employed for the outer joint portion on the side of a right or left side frame, the outer joint portion can be assembled to butt against the side frame in a gapless state to form a strong joint therebetween. In addition, the flare tube which is formed by a casting means has a smooth and seamless sectional shape from the intermediate tubular portion to the spread joining end, lessening stresses which will act on the joint portions.

According to another feature of the present invention, the outer joint portion on the side of a side frame is constituted by the flare tube.

With the arrangements just described, it becomes possible to form a far longer welding bead around the outer joint portion on the side of the side frame to enhance the joint strength between the leg and the side frame.

According to still another feature of the present invention, both of the inner joint portion on the side of the center frame and the outer joint portion on the side of a side frame are constituted by the flare tube.

With the arrangements just described, it becomes possible to form a far longer welding bead not only around the inner joint portion on the side of the center frame but also around the outer joint portion on the side of the side frame thereby to enhance the joint strength between the leg and the center frame and between the leg and the side frame.

According to still another feature of the present invention, the legs are each constituted by an unitary tubular structure formed by casting the inner and outer joint portions integrally along with the intermediate tubular portion.

With the arrangements just described, at least the inner joint portion on the side of the center frame or the outer joint portion on the side of the side frame can be formed in the shape of a flare tube even in a case where the inner and outer joint portions and the intermediate tubular portion are integrally formed by the use of a casting means. As a consequence, it becomes possible to form a far longer welding bead around said joint portion to enhance the joint strength. Besides, since each leg can be formed as an unitary integral structure, it becomes possible to reduce the production cost of the truck frame to a significant degree.

According to the present invention, the legs are each constituted by an unitary tubular structure formed by joining together three members, including the inner joint member for the inner joint portion on the side of the center frame, the outer joint member for the outer joint portion on the side of either one of the side frames and an intermediate tubular member for the intermediate tubular portion.

With the arrangements just described, at least the inner joint member on the side of the center frame or the outer joint member on the side of the side frame can be formed in the shape of a flare tube to form a longer welding bead around the joint member even in a case where the legs are formed by joining together three members, i.e., an inner joint member on the side of the center frame, an outer joint member on the side of the side frame and an intermediate tubular member. Further, it becomes possible to prefabricate the inner and outer joint members separately as small-size units and then to join the inner and outer joint members together by way of the intermediate tubular member. Accordingly, in this case, the inner joint member on the side of the center frame as well as the outer joint member on the side of the side frame can be cast by the use of an inexpensive mold to cut the leg production cost.

According to another feature of the present invention, the legs are each constituted by an unitary tubular structure formed by joining together the inner joint member for the inner joint portion on the side of the center frame and the outer joint member for the outer joint portion on the side of either one of the side frames in such a way as to provide the intermediate tubular portion in an longitudinally intermediate position between inner and outer joint portions.

With the arrangements just described, even in a case where a leg is formed by the use of an inner joint member on the side of the center frame and an outer joint member on the side of the side frame, at least the inner or outer joint member can be formed in the shape of a flare tube, for forming a longer welding bead around the flared end of the joint member. Further, for example, the inner joint member on the side of the center frame and the outer joint member on the side of the side frame can be separately cast as small-size units, joining together the cast units later to form a leg. Accordingly, the inner joint member on the side of the center frame as well as the outer joint member on the side of the side frame can be fabricated by the use of an inexpensive mold to cut the leg production cost.

In this instance, according to the present invention, both of the inner joint member on the side of the center frame and the outer joint member on the side of one of the side frames can be formed in the shape of a flare tube, and the intermediate tubular portion can be formed integrally on a flare tube for the outer joint member on the side of the side frame.

Alternatively, in this instance, both of the inner joint member on the side of the center frame and the outer joint member on the side of one of the side frames can be formed in the shape of a flare tube, and the intermediate tubular portion can be formed integrally on a flare tube for the inner joint member on the side of the center frame.

Otherwise, in this instance, the both of the inner joint member on the side of the center frame and the outer joint member on the side of one of the side frames can be formed in the shape of a flare tube, and the intermediate tubular portion can be formed partly with a partial intermediate tubular portion on the inner joint member and partly with a partial intermediate tubular portion on the outer joint member.

According to another feature of the present invention, each one of the side frames is constituted by four members, including an intermediate frame portion extending towards fore and rear ends, an idle wheel bracket provided at one longitudinal end of the intermediate frame portion, a motor bracket provided at the other longitudinal end of the intermediate frame portion, and a rear connecting flange provided between the other longitudinal end face of the intermediate frame portion and the motor bracket to join these parts together; and each one of the hind legs is extended obliquely in a rearward direction and the flare tube of the outer joint portion of the each hind leg is adapted to be joined partly with the rear end portion of the intermediate frame portion and partly with the rear connecting flange.

With the arrangements just described, the hind leg of the outer joint portion on the side of the side frame can be welded to broader areas including a rear end portion of the intermediate frame portion and a rear connecting flange on the side of the motor bracket portion to enhance the joint strength of the outer joint portion on the side of the side frame.

According to the present invention, the connecting flange is provided with an inner flange projecting inward of the side frame toward the center frame, and the flare tube of the outer joint portion of each hind leg is adapted to be joined with both a rear end portion of the intermediate frame portion and the inner flange of the rear connecting flange of the side frame.

With the arrangements just described, it becomes possible to form a far longer welding bead at the time of welding the flare tube of the outer joint portion of the hind leg to the inner extension of the rear connecting flange.

According to the present invention, the flare tube of the outer joint portion of each hind leg is provided with a first outer joining end to be joined with the intermediate frame portion and a second outer joining end to be joined with the rear connecting flange, the first and second outer joining ends being disposed substantially at right angles relative to each other at an outer end of the flare tube; the rear connecting flange being provided with an outer flange surface in confronting relation with an end face of the side frame and an inner flange surface projected inward from the outer flange surface toward the center frame; the outer flange surface of the connecting flange is joined with a rear end of the intermediate frame portion of the side frame and the inner flange surface of the connecting flange is joined with an second outer joining end of the flare tube on the side of the connecting flange.

With the arrangements just described, the first outer joining end which is provided at the outer end of the flare tube of the hind leg can be abutted against and welded to the intermediate frame portion of the side frame in a gapless state. Likewise, the second outer joining end can be abutted against and welded to the inner flange surface of the connecting flange in a gapless state. Accordingly, the flare tube which constitutes the outer joint portion of the hind leg can be strongly joined with both the side frame and the connecting flange.

According to a further feature of the present invention, the fore legs are extended obliquely in forward direction or in rightward and leftward directions, and the outer joint portion of each fore leg is joined with the intermediate frame portion of the side frame by welding.

With the arrangements just described, the outer joint portion of the fore leg can be strongly joined with the intermediate frame portion of the side frame.

BEST MODE FOR CARRYING OUT THE INVENTION

Figure 1:
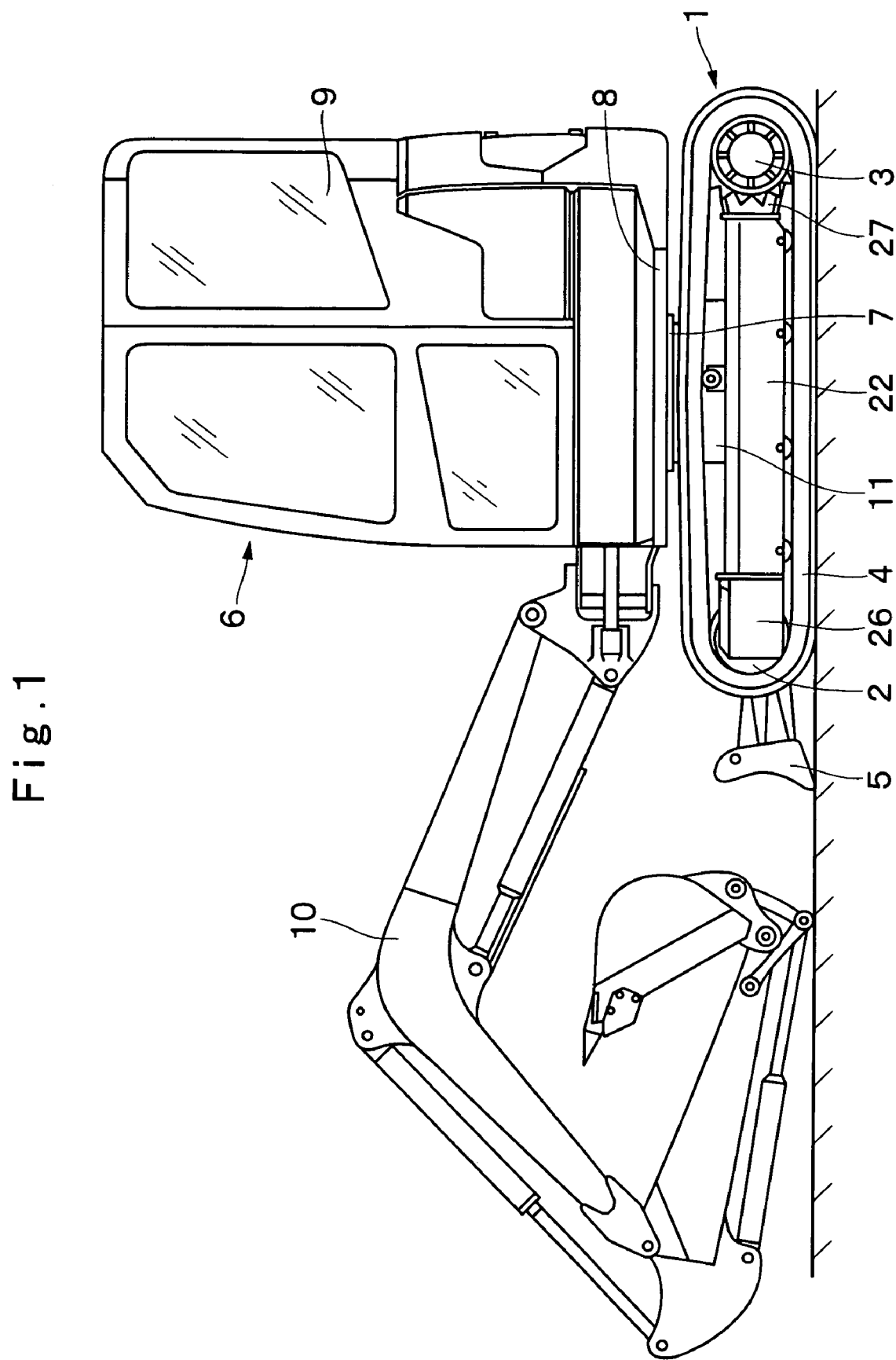
FIG. 1 is a front view of a hydraulic excavator which is equipped with a truck frame according to a first embodiment of the present invention.

Hereafter, with reference to FIGS. 1 through 24, a truck frame for a construction machine according to the present invention is described more particularly by way of its preferred embodiments which are applied by way of example to a lower structure of a hydraulic excavator.

Referring first to FIGS. 1 to 12, there is shown a truck frame of a hydraulic excavator, according to a first embodiment of the present invention.

In these figures, indicated at 1 is a lower structure of the hydraulic excavator. The lower structure 1 is largely constituted by a truck frame 11, idle and drive wheels 2 and 3 provided at the opposite longitudinal ends of side frames 22 and 28 of the truck frame, and crawler belts 4 passed around the drive and idle wheels 3 and 2 of the respective side frames 22 and 28.

Driving the crawler belts 4 to turn around with the drive wheels 3, the lower structure 1 can travel in a stabilized state on rough terrains including mountainous and swampy terrains. A sweeper blade 5 is vertically pivotally attached to the front side of the lower structure 1 for use in removing and dumping sand and soil or in leveling ground surfaces.

Indicated at 6 is an upper structure which is rotatably mounted on the lower structure 1. The upper structure 6 is provided with a revolving frame 8 which is mounted on the truck frame 11 through a swing ring 7, and a cab 9 which is provided on the revolving frame 8. Further, a swing post type working mechanism 10 is provided in a front side of the rotatable upper structure 6 to carry out, for example, a soil excavating or digging operation.

Figure 2:
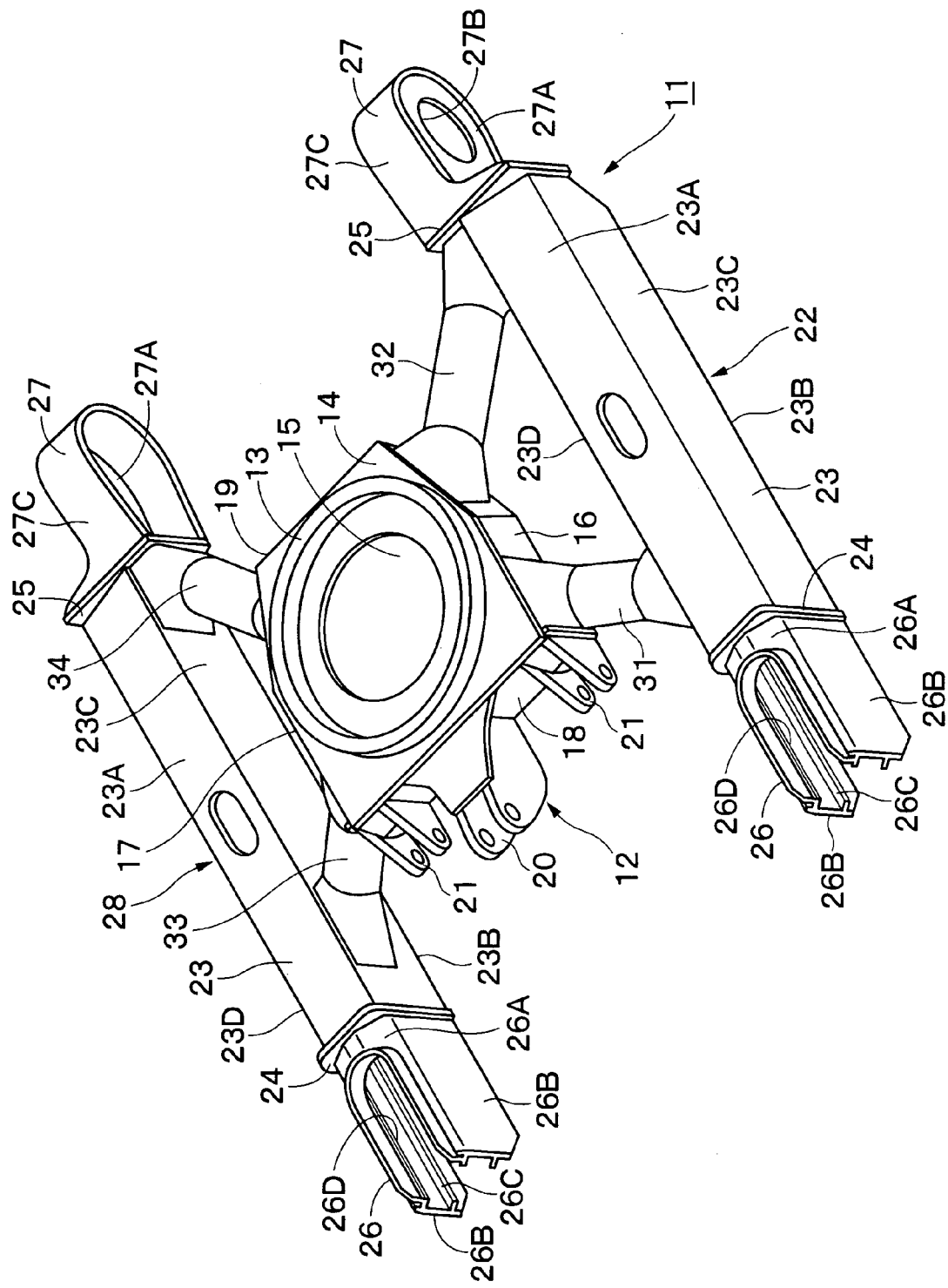
FIG. 2 is a perspective view showing the truck frame on an enlarged scale.
Figure 3:
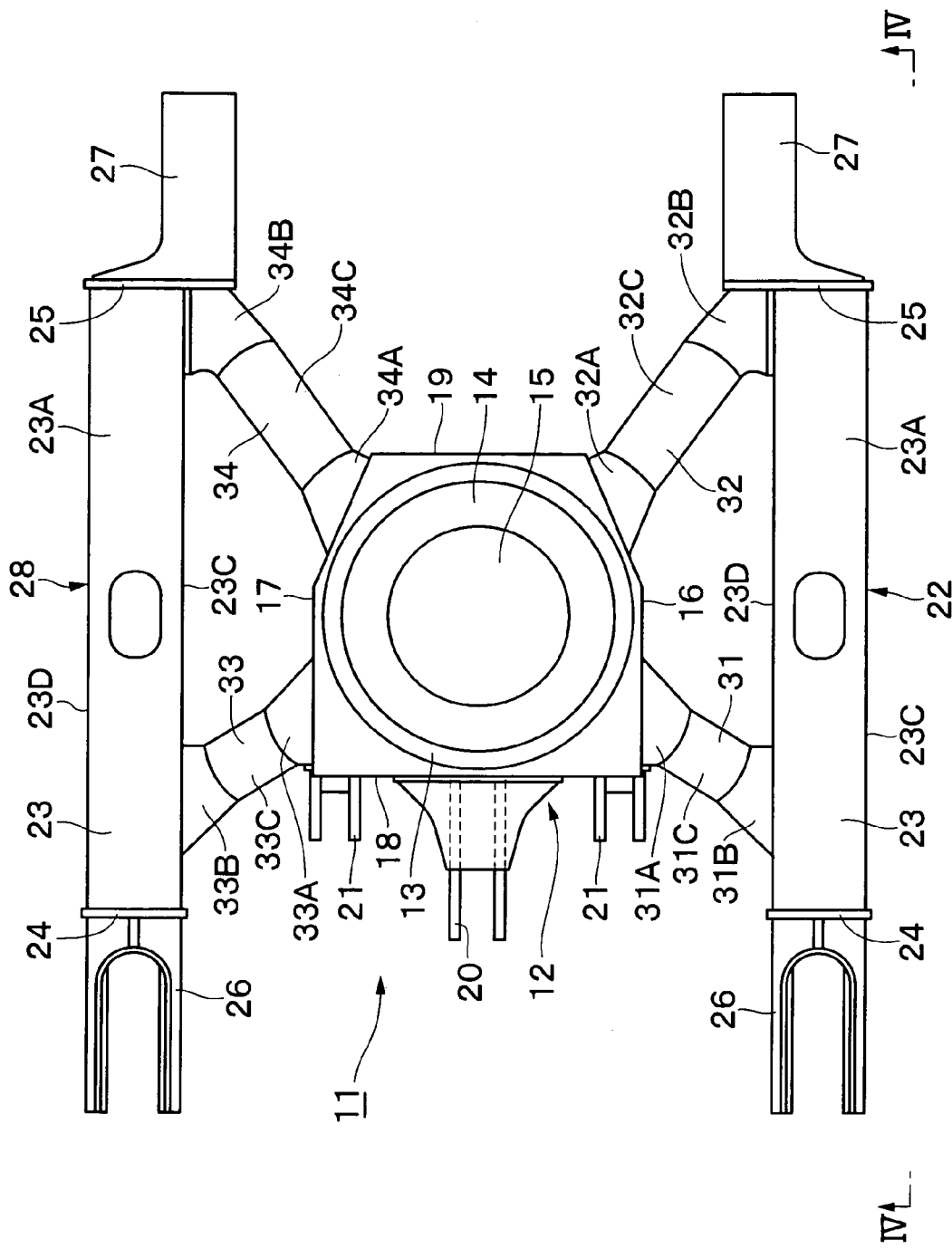
FIG. 3 is a plan view of the truck frame.
Figure 4:
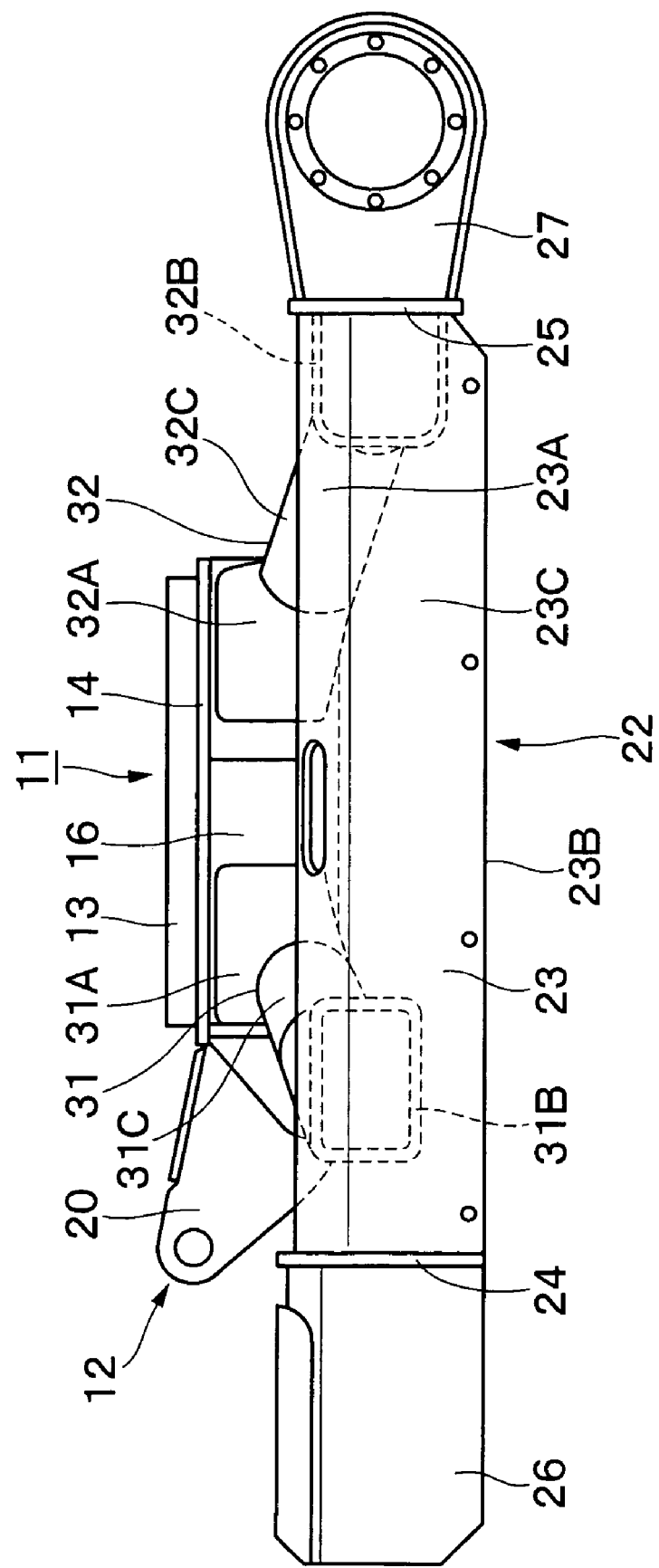
FIG. 4 is a front view of the truck frame, taken from the direction of arrows IV-IV in FIG. 3.

Designated at 11 is a truck frame of the lower structure 1. As shown in FIGS. 2 to 4 and as described in greater detail hereinafter, this truck frame 11 is constituted by a center frame 12, a left side frame 22, a right side frame 28, a left fore leg 31, a left hind leg 32, a right fore leg 33, and a right hind leg 34.

The center frame indicated at 12 constitutes a center portion of the truck frame 11. In this instance, the center frame 12 is provided with a top plate 14 of a hexagonal shape having a round girth member 13 securely fixed thereon for mounting the swing ring 7, a bottom plate 15 which is formed in a hexagonal shape similarly to the top plate 14 and disposed face to face with the latter in the vertical direction, a left side plate 16 which is located at the left side of the top and bottom plates 14 and 15, a right side plate 17 which is located at the right side of the top and bottom plates 14 and 15, a front plate 18 which is extended transversely on the front side of the left and right side plates 16 and 17, and a rear plate 19 which is extended transversely on the rear side of the left and right side plates 16 and 17 to be narrower than the front plate 18.

In the case of the particular embodiment shown, the left side plate 16 is bent in such a way that it is gradually set apart from the side frame 22 from its front to rear side. The left side plate 16 is welded to the left side of the top plate 14 and the bottom plate 15, closing the left side between the top and bottom plates 14 and 15. On the other hand, the right side plate 17 is bent in such a way that it is gradually set apart from the side frame 28 from its front to rear side. The right side plate 17 is welded to the right side of the top and bottom plates 14 and 15, closing the right side between the top and bottom plates 14 and 15. Further, the front plate 18 is welded to the front side of the top and bottom plates 14 and 15 and the right and left side plates 17 and 16, closing the front side between the top and bottom plates 14 and 15. Furthermore, the rear plate 19 is welded to the rear side of the top and bottom plates 14 and 15 and the right and left side plates 17 and 16, closing the rear side between the top and bottom plates 14 and 15. Thus, the center frame 12 is formed into a structure of a flat hexagonal box-like shape by the top and bottom plates 14 and 15, the right and left side plates 17 and 16 and the front and rear plates 18 and 19.

Indicated at 20 is a mounting bracket which is securely welded to a center portion of the front plate 18 of the center frame 12. This mounting bracket 20 is projected forward of the center frame 12, and connected to a hydraulic cylinder (not shown) which is operated to turn up and down the sweeper blade 5 of FIG. 1.

Denoted at 21 are a pair of supporting brackets which are securely welded to the front plate 18 of the center frame 12 on the opposite sides of the mounting bracket 20. These supporting brackets 21 are projected in an obliquely downward direction from the center frame 12 and are rotatably connected to respective right and left support arms (not shown) of the sweeper blade 5 shown in FIG. 1.

Indicated at 22 is the left side frame which is located on the left side of the center frame 12 and extended between or toward front and rear directions. This left side frame 22 is constituted by an intermediate frame portion 23, a front connecting flange 24, a rear connecting flange 25, idle wheel brackets 26 and motor brackets 27, which will be described hereinafter.

The intermediate frame portion 23 constitutes a main body portion of the side frame 22, and formed by bending a steel plate or plates or by welding steel plates into a rectangular box-like structure which is enclosed by a top wall 23A, a bottom wall 23B, a left side wall 23C and a right side wall 23D.

The front connecting flange 24 closes the fore end of the intermediate frame portion 23. This front connecting flange 24 is constituted by a flat plate, for example, a flat steel plate and securely attached to the front end of the intermediate frame portion 23 by welding.

Figure 5:
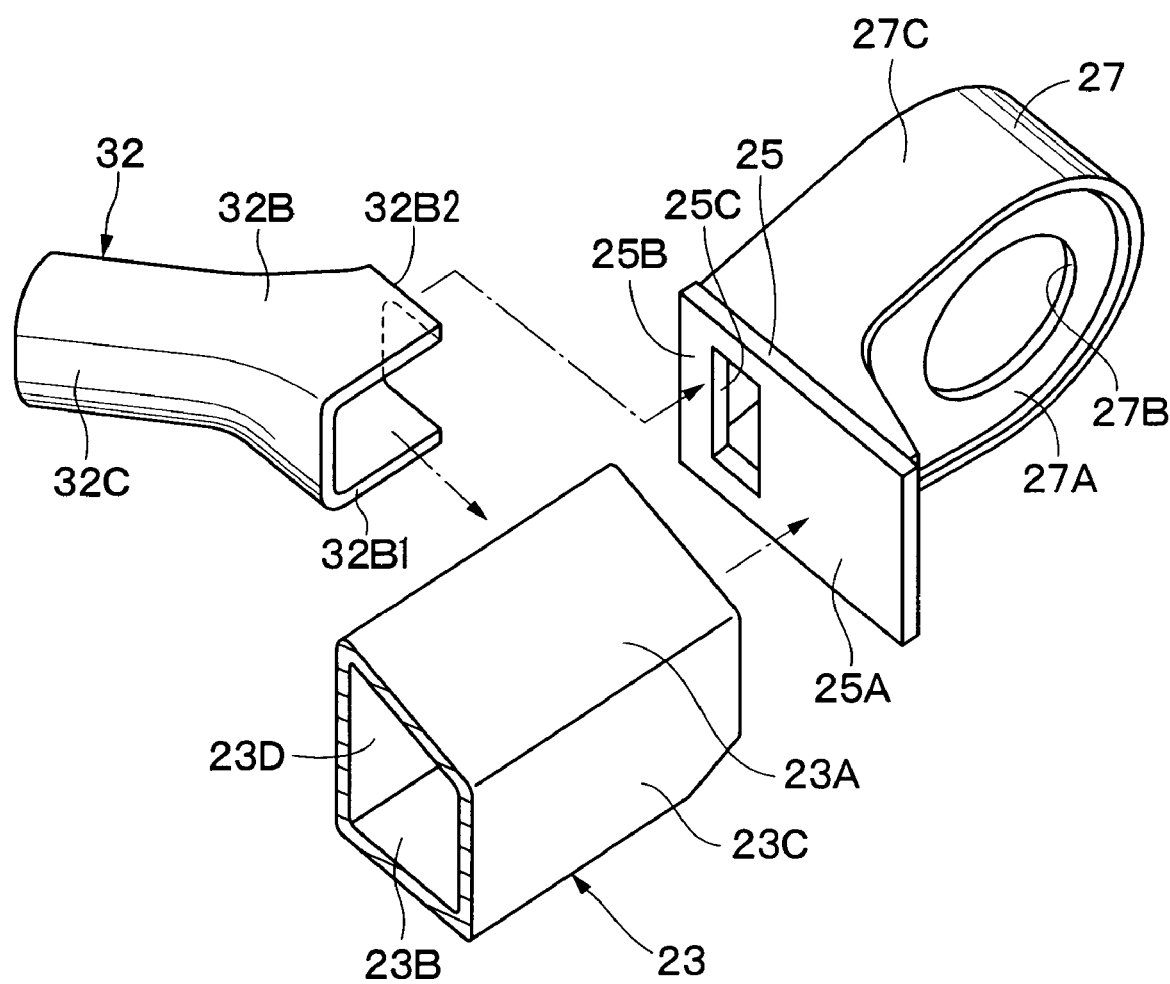
FIG. 5 is an exploded perspective view of a left side frame, a rear connecting flange and a left hind leg.

The rear connecting flange 25 closes the rear end of the intermediate frame portion 23. Similarly to the front connecting flange 24, this rear connecting flange is also constituted by a flat steel plate or the like and securely attached to the rear end of the intermediate frame portion 23 by welding. In this instance, as shown in FIGS. 2 and 5, the rear connecting flange 25 is formed in a rectangular shape which is broader in breadth in the transverse direction as compared with the front connecting flange 24. The rear connecting flange 25 is composed of an outer flange surface 25A facing the rear end of the intermediate frame portion 23, and an inner flange surface 25B which is extended inward from the outer flange surface 25A toward the center frame 12 as an inner extension portion. Further, a hose passage hole 25C is opened in the inner flange surface 25B for passing hydraulic hoses 3C which will be described hereinafter.

The outer flange surface 25A of the rear connecting flange 25 is securely attached to the rear side end of the intermediate frame portion 23 by welding. On the other hand, the inner flange surface 25B of the rear connecting flange 25 is extended inward of the right side wall 23D of the intermediate frame portion 23 (in a direction toward the center frame 12) and securely welded to a second outer joining end 32B2 of a left hind leg 32 on the side of the rear connecting flange, which will be described hereinafter.

Indicated at 26 are the idle wheel brackets for supporting the idle wheels 2. These idle wheel brackets 26 are attached to the front ends of the intermediate frame portions 23, respectively, each through a front connecting flange 24. In this instance, the idle wheel brackets 26 are each formed, for example, by bending a steel plate or plates into a forked frame structure having top wall 26A and right and left side walls 26B. Idle wheel guides 26C are provided inside the idle wheel brackets 26 thereby to support the idle wheel 2 of FIG. 1 movably back and forth in the longitudinal direction. A notch 26D substantially of U-shape is formed into the top wall 26A of each idle wheel bracket 26 to allow the idle wheel 2 to move back and forth along the idle wheel guides 26C.

Indicated at 27 are the motor brackets for mounting a hydraulic motor 3A of the drive wheels 3. These motor brackets 27 are securely attached to the rear ends of the intermediate frame portions 23 each through a rear connecting flange 25. In this instance, motor brackets 27 are each constituted by a mounting plate 27A which is securely fixed to and arcuately projected on the rear side of the rear connecting flange 25, a motor mount hole 27B which is opened in the mounting plate 27A, and a flange plate 27C of substantially U-shape which is securely fixed to and around the outer periphery of the mounting plate 27A.

Figure 8:
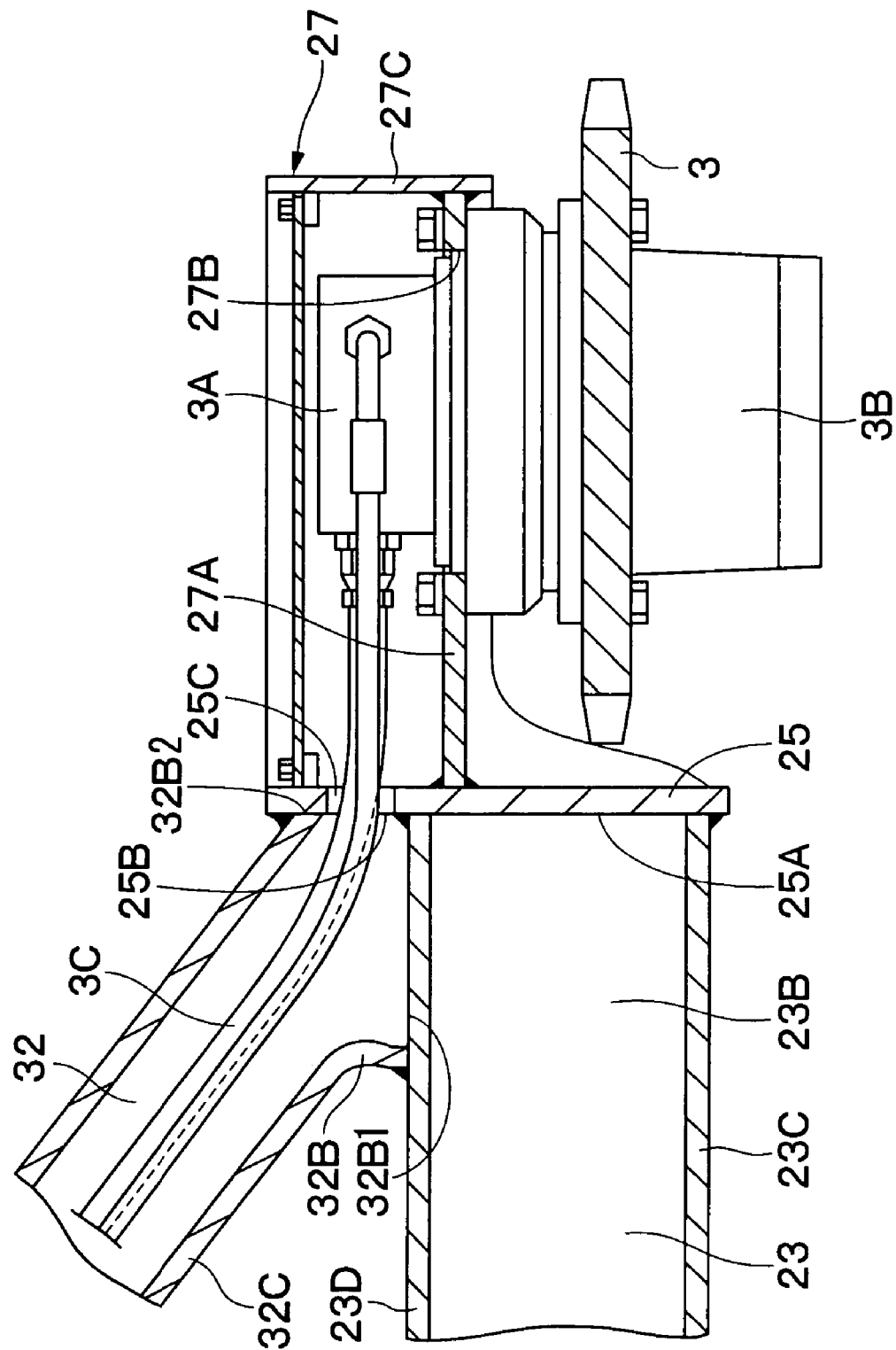
FIG. 8 is an enlarged horizontal sectional view showing a hydraulic motor which is mounted on the motor bracket of FIG. 7.

As shown in FIG. 8, a hydraulic motor 3A is mounted on the mounting plate 27A of the motor bracket 27 as a vehicular drive motor which rotates the drive wheel 3 at the time of a vehicular traveling operation. Rotation of the hydraulic motor 3A is transmitted to the drive wheel 3 through a reduction system 3B. For charging and discharging operating oil pressure which is supplied from a hydraulic pressure source (not shown), a plural number of hydraulic hoses 3C are connected to the hydraulic motor 3A. Through the hose passage hole 25C formed in the rear connecting flange 25 (in the inner flange surface 25B), the hydraulic hoses 3C are led into a left hind leg 32, which will be described hereinafter, and routed through the left hind leg 32 toward the hydraulic pressure source.

Indicated at 28 is the right side frame which is located on the right side of the center frame 12 and extended to front and rear direction. Similarly to the left side frame 22, this right side frame 28 is constituted by an intermediate frame portion 23, a front connecting flange 24, a rear connecting flange 25, an idle wheel bracket 26 and a motor bracket 27.

Denoted at 31 is a left fore leg which is connected between the left side frame 22 and the center frame 12 along with the left hind leg 32 which will be described hereinafter. This left fore leg 31 has one end thereof joined with a front portion of the center frame 12 (the left side plate 16), and has the other end extended obliquely in the forward direction and joined with a right side wall 23D of the intermediate frame portion 23 of the left side frame 22.

Figure 6:
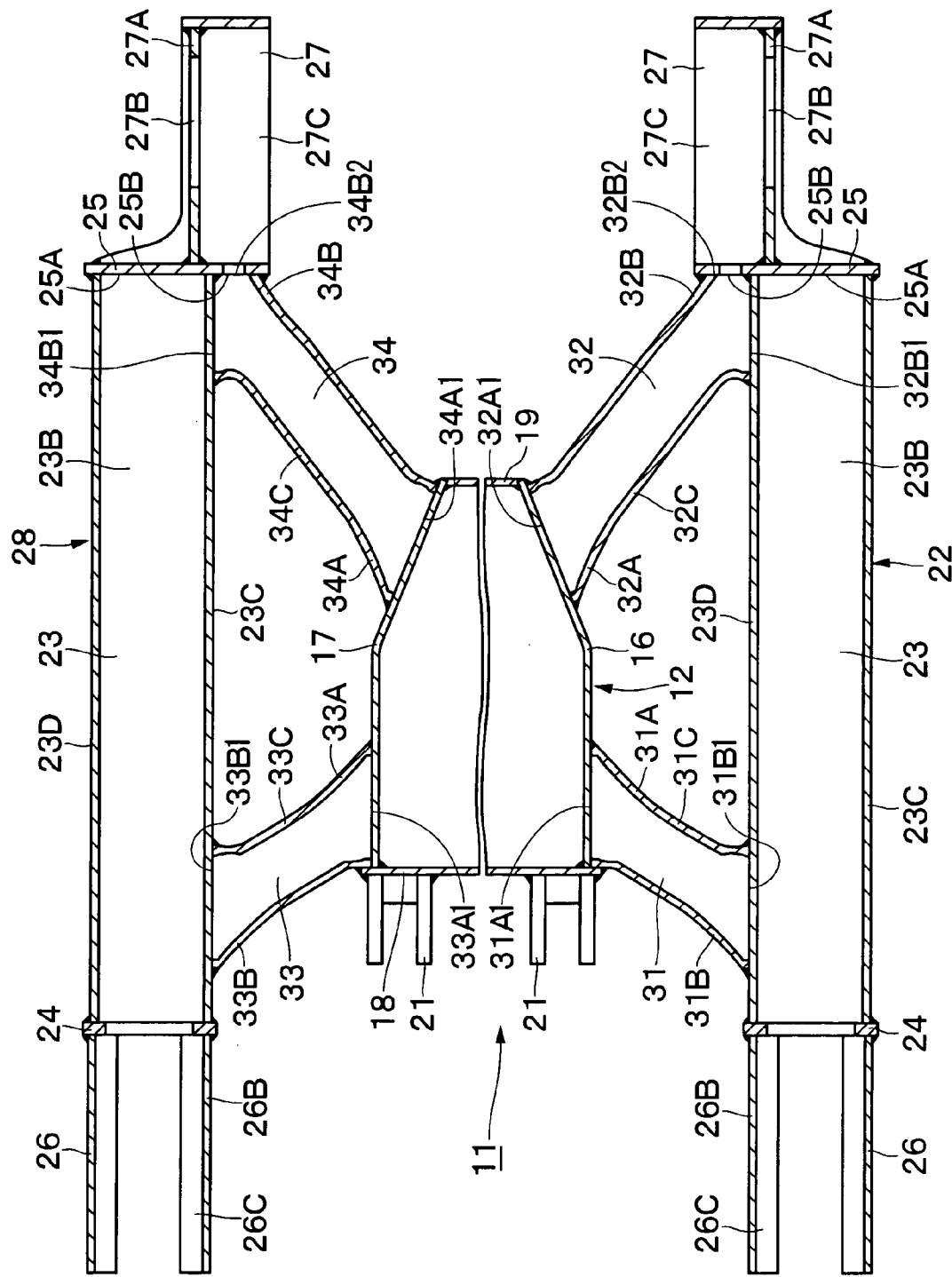
FIG. 6 is a horizontal sectional view taken through center frame, right and left side frames, left fore leg, left hind leg, right fore leg and right hind leg shown in FIG. 3.
Figure 7:
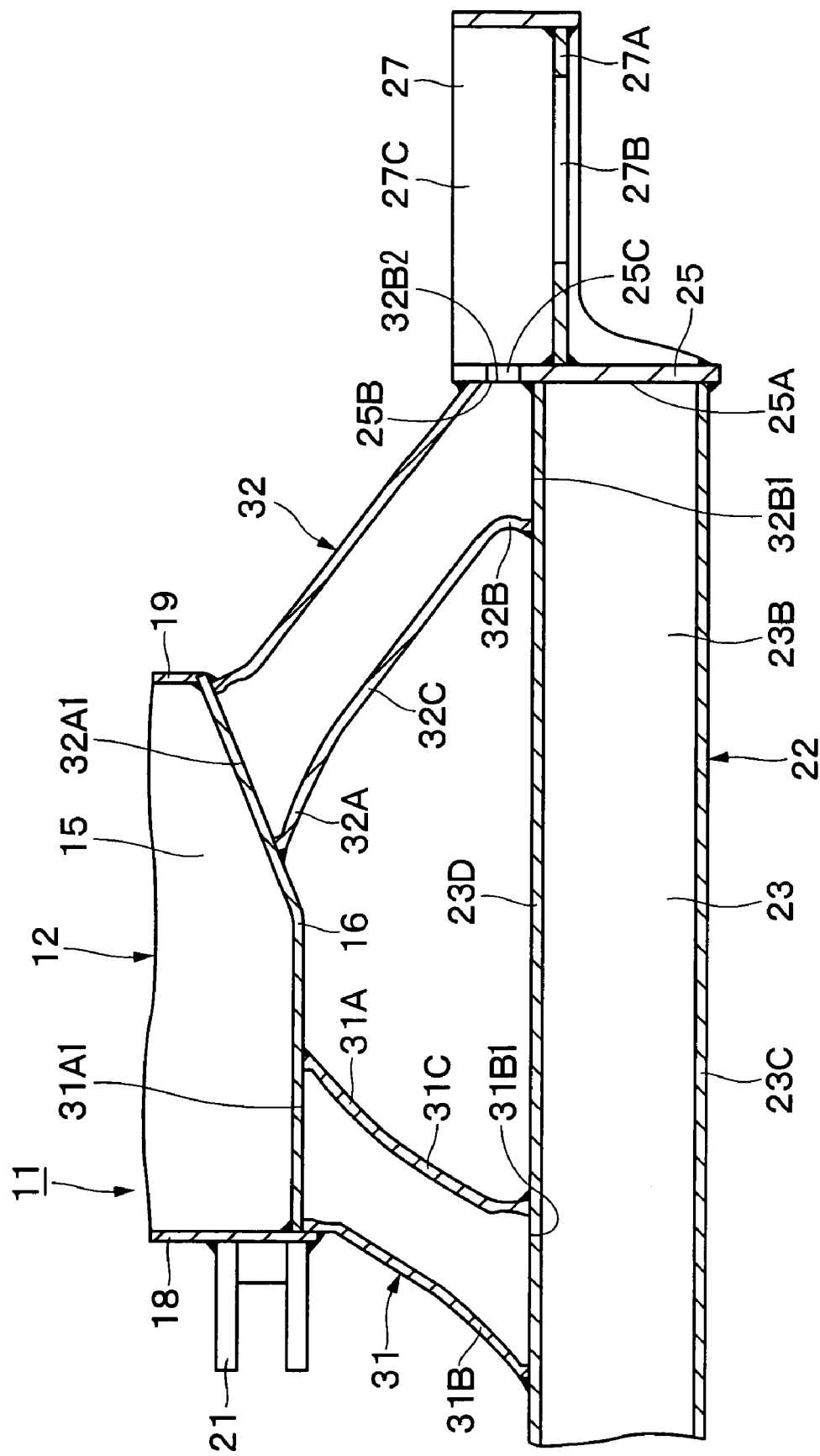
FIG. 7 is an enlarged horizontal sectional view showing the center frame, left side frame, left fore leg, left hind leg and motor bracket of FIG. 6 on an enlarged scale.
Figure 9:
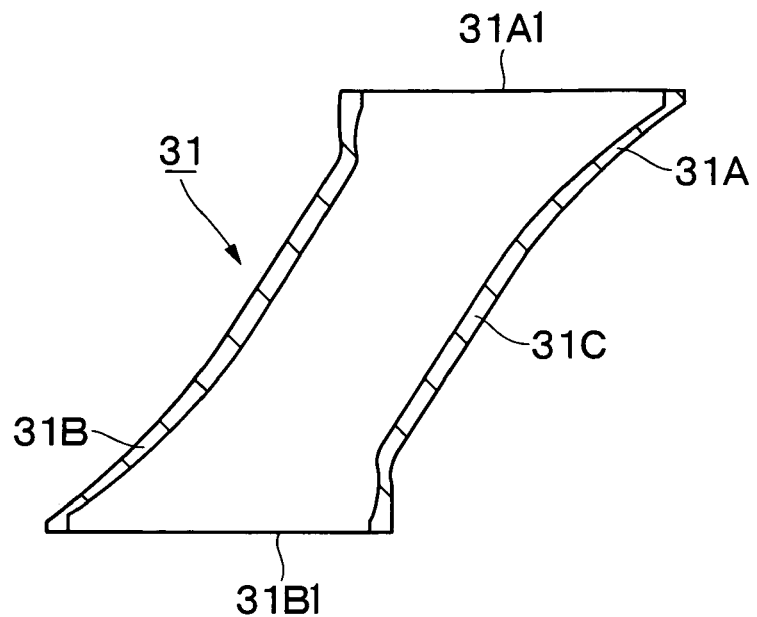
FIG. 9 is a sectional view of the left fore leg of FIG. 7 alone.

In this instance, as shown in FIGS. 6, 7 and 9, the left fore leg 31 is constituted by an inner joint portion 31A which is securely welded to the left side plate 16 of the center frame 12, an outer joint portion 31B which is securely welded to the right side wall 23D of the left side frame 22 (the intermediate frame portion 23), and an intermediate tubular portion 31C which is provided between the inner joint portion 31A on the side of the center frame and the outer joint portion 31B on the side of the side frame. These inner joint portion 31A on the side of the center frame, the outer joint portion 31B on the side of the side frame and the intermediate tubular portion 31C are formed integrally as an unitary tubular structure (e.g., casting) with the use of a molten iron-base metal, for example, such as cast steel material or weldable cast iron (e.g., decarburized cast iron).

Further, the inner joint portion 31A on the side of the center frame is formed in the shape of a flare tube gradually spreading in diameter in the fashion of a trumpet from the intermediate tubular portion 31C, which is substantially in a spreading tubular shape, toward its inner joining end 31A1 (the inner open end on the side of the center frame 12). The opening at the inner joining end 31A1 is formed in a flat rectangular shape which can be assembled to butt against the left side plate 16 of the center frame 12 intimately in a gapless state.

In this manner, the inner joining end 31A1 of the inner joint portion 31A on the side of the center frame is formed in the shape of a flare tube, permitting to form a far longer welding bead around the inner joining end 31A1 when butt-welding same to the left side plate 16 of the center frame 12. This contributes to enhance the joint strength between the center frame 12 and the inner joint portion 31A on the side of the center frame. Further, since the inner joint portion 31A on the side of the center frame is formed as a flare tube by casting, its sectional shape of the inner joint portion 31A is varied smoothly and seamlessly from the intermediate tubular portion 31C toward the inner joining end 31Al. This arrangement contributes to reduce the stress which will be exerted on the joint portions between the center frame 12 and the left fore let 31.

Similarly, the outer joint portion 31B on the side of the side frame is formed in the shape of a flare tube gradually spreading in diameter in the fashion of a trumpet from the intermediate tubular portion 31C toward the outer joining end 31B1 (an outer open end on the side of the side frame 22). The opening at the outer joining end 31B1 is formed in a flat rectangular shape which can be arranged to butt against the right side wall 23D of the side frame 22 (the intermediate frame portion 23) in a gapless state.

Thus, as the outer joining end 31B1 of the outer joint portion 31B on the side of the side frame is formed in the shape of a flare tube as described above, it permits to form a far longer welding bead around the outer joining end 31B1 at the time of butt-welding same to the right side wall 23D of the side frame 22. Accordingly, it becomes possible to enhance the joint strength between the outer joint portion 31B and the side frame 22. Further, since the outer joint portion 31B on the side of the side frame is formed in the shape of a flare tube by the use of a casting means, the outer joint portion 31B on the side of the side frame has a sectional shape which varies smoothly and seamlessly in diameter from the intermediate tubular portion 31C toward the outer joining end 31B1. This arrangement contributes to reduce stresses which will be exerted on joint portions between the side frame 22 and the left fore leg 31.

Indicated at 32 is the left hind leg which is connected between the left side frame 22 and the center frame 12, along with the left fore leg 31. This left hind leg 32 is joined with a rear portion of the center frame 12 (the left side plate 16) at its inner end, and joined with right side wall 23D of the intermediate frame portion 23 of the side frame 22 to be extended obliquely in the rearward at the other end and an inner flange surface 25B of the rear connecting flange 25 at its outer end.

Figure 10:
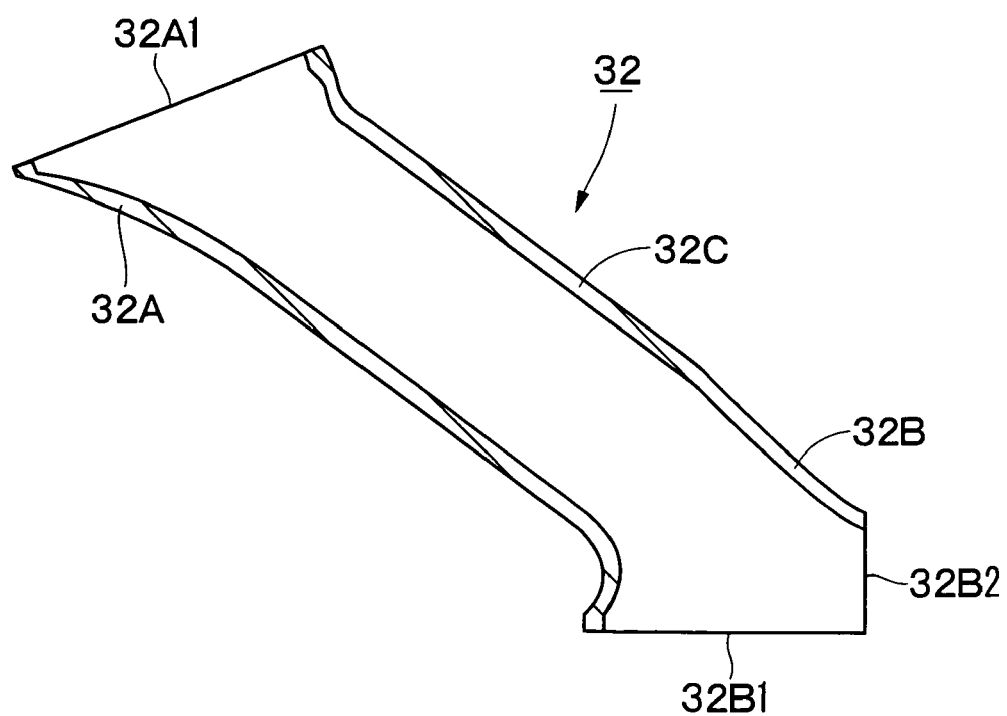
FIG. 10 is a sectional view of the left hind leg of FIG. 7 alone.
Figure 11:
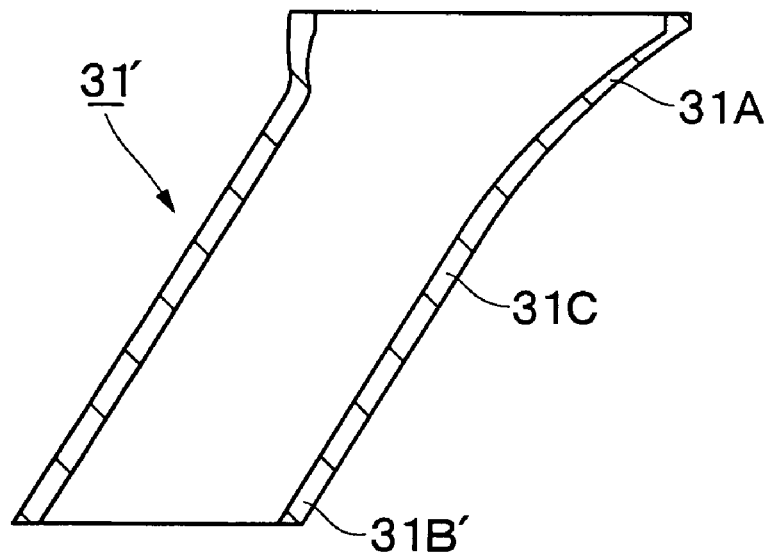
FIG. 11 is a sectional view similar to FIG. 9 but showing a first modification of the left fore leg alone.

In this instance, as shown in FIGS. 7 and 10, the left hind leg 32 is constituted by an inner joint portion 32A which is securely joined with the left side plate 16 of the center frame 12 by welding, an outer joint portion 32B which is joined with the right side wall 23D of the side frame 22 (the intermediate frame portion 23) and the inner flange surface 25B of the rear connecting flange 25, and an intermediate tubular portion 32C which is interposed between the inner joint portion 32A on the side of the center frame and the outer joint portion 32B on the side of the side frame. These inner joint portion 32A on the side of the center frame, the outer joint portion 32B on the side of the side frame and the intermediate tubular portion 32C are formed integrally as an unitary tubular structure by the use of a casting means using molten iron-base metal such as cast steel material, cast iron material or the like.

The inner joint portion 32A on the side of the center frame is formed in the shape of a flare tube gradually spreading in diameter toward the inner joining end 32A1 (the open end on the side of the center frame 12) from the intermediate tubular portion 32C which is substantially in a spreading tubular shape. The opening at the inner joining end 32A1 is formed in a flat rectangular shape which can be assembled to butt against the left side plate 16 of the center frame 12 intimately in a gapless state, permitting to form a far longer welding bead around the inner joining end 32A1. Further, since the inner joint portion 32A on the side of the center frame is formed in the shape of a flare tube by the use of a casting means, it has a sectional shape which is varied smoothly and seamlessly in diameter from the intermediate tubular portion 32C toward the inner joining end 32A1. This arrangement contributes to reduce stresses which will be exerted on joint portions between the center frame 12 and the left hind leg 32.

Similarly, the outer joint portion 32B on the side of the side frame is formed in the shape of a flare tube spreading gradually from an intermediate tubular portion 32C toward a first outer joining end 32B1 (the open end on the side of the side frame 22) and a second outer joining end 32B2 on the side of the rear connecting flange (the open end on the side of the rear connecting flange 25). In this instance, the first outer joining end 32B1 on the side of the side frame and the second outer joining end 32B2 on the side of the connecting flange are disposed at right angles relative to each other at the outer open end. The first outer joining end 32B1 on the side of the side frame is arranged to butt against the right side wall 23D of the side frame 22 (the intermediate frame portion 23) in a gapless state, and joined with the right side wall 23D by welding. On the other hand, the second outer joining end 32B2 on the side of the connecting flange is arranged to butt against the inner flange surface 25B of the rear connecting flange 25 in a gapless state, and joined with the inner flange surface 25B by welding in such a way as to cover the hose passage hole 25C. As a consequence, it becomes possible to form a far longer welding bead around the first outer joining end 32B1 on the side of the side frame as well as the second outer joining end 32B2 on the side of the connecting flange. Further, since the outer joint portion 32B on the side of the side frame is formed in the shape of a flare tube by the use of a casting means, it has a sectional shape smoothly spreading in diameter from the intermediate tubular portion 32C toward the first outer joining end 32B1 on the side of the side frame and the second outer joining end 32B2 on the side of the rear connecting flange. Accordingly, this arrangement contributes to reduce stresses which will be exerted on joint portions between the side frame 22 and the left hind leg 32.

Indicated at 33 is a right fore leg which is connected between the right side frame 28 and the center frame 12, together with a right hind leg 34 which will be described hereinafter. Similarly to the left fore leg 31, the right fore leg 33 is constituted by an inner joint portion 33A which is joined with the right side plate 17 of the center frame 12, an outer joint portion 33B which is joined with the left side wall 23C of the side plate 28 (intermediate frame portion 23), and an intermediate tubular portion 33C which is interposed between the inner joint portion 33A on the side of the center frame and the outer joint portion 33B on the side of the side frame. Further, also similarly to the left fore leg 31, the right fore leg 33 is formed integrally into an unitary tubular structure by the use of a casting means.

In this instance, the inner joint portion 33A on the side of the center frame is formed in the shape of a flare tube which is gradually spread in diameter from the intermediate tubular portion 33C toward an inner joining end 33A1 (the open end on the side of the center frame 12). The opening at the inner joining end 33A1 is formed in a rectangular shape which can be assembled to butt against the right side plate 17 of the center frame 12 in a gapless state.

On the other hand, the outer joint portion 33B on the side of the side frame is formed in the shape of a flare tube which is gradually spread from the intermediate tubular portion 33C toward its outer joining end 33B1 (the open end on the side of the side frame 28). The open outer joining end 33B1 is formed in a rectangular shape which can be assembled to butt against the left side wall 23C of the side frame 28 (the intermediate frame portion 23) in a gapless state.

Denoted at 34 is the right hind leg which is connected between the right side frame 28 and the center frame 12, along with the right fore leg 33. Similarly to the left hind leg 32, the right hind leg 34 is constituted by an inner joint portion 34A which is joined with the right side plate 17 of the center frame 12, an outer joint portion 34B which is joined with the left side wall 23C of the side frame 28 (the intermediate frame portion 23) and the inner flange surface 25B of the rear connecting flange 25, and an intermediate tubular portion 34C which is provided between the inner joint portion 34A on the side of the center frame and the outer joint portion 34B on the side of the side frame. Similarly to the left hind leg 32, the right hind leg 34 is also integrally formed into an unitary tubular structure by the use of a casting means.

In this instance, the inner joint portion 34A on the side of the center frame is formed in the shape of a flare tube which is gradually spread in diameter from the intermediate tubular portion 34C toward the inner joining end 34A1 (the open end on the side of the center frame 12). The opening at the inner joining end 34A1 is formed in a rectangular shape which can be assembled to butt against the right side plate 17 of the center frame 12 in a gapless state.

On the other hand, the outer joint portion 34B is formed in the shape of a flare tube which is gradually spread in diameter from an intermediate tubular portion 34C toward a first outer joining end 34B1 on the side of the side frame (the open end on the side of the side frame 28) and a second outer joining end 34B2 on the side of the connecting flange (the open end on the side of the rear connecting flange 25). In this instance, the first outer joining end 34B1 on the side of the side frame and the second outer joining end 34B2 on the side of the connecting flange are disposed at right angles relative to each other at the outer open end. The first outer joining end 34B1 on the side of the side frame is joined with the left side wall 23C by welding in a shape which can be assembled to butt against the left side 23C of the side frame 28 (the intermediate frame portion 23) in a gapless state. On the other hand, the second outer joining end 34B2 on the side of the connecting flange is formed in a shape which can be assembled to butt against the inner flange surface 25B of the rear connecting flange 25 in a gapless state, and welded to the inner flange surface 25B in such a way as to cover the hose passage hole 25C.

Being arranged in the manner as described above, the truck frame 11 according to the present embodiment of the invention has the following operational effects when applied to a lower structure of a hydraulic excavator.

In the first place, with regard to the left side frame 22, both of the left fore leg 31 and the left hind leg 32 which connect the side frame 22 to the center frame 12 are each formed as an unitary tubular structure by the use of a casting means such as cast steel material, cast iron material or the like.

This means that the production cost of the truck frame 11 can be reduced markedly, thanks to omission of machining and welding operations which would be required in the case of a truck frame having legs formed by assembling and welding together properly machined top, bottom front and rear plates.

Further, the inner joint portion 31A on the side of the center frame and the outer joint portion 31B on the side of the side frame of the left fore leg 31, which are each formed by casting, can be fabricated with high precision. Accordingly, the inner joint portion 31A on the side of the center frame can be assembled to butt on the center frame 12 in a gapless state to form a strong joint therebetween. Similarly, the outer joint portion 31B on the side of the side frame can be assembled to butt on the intermediate frame portion 23 of the side frame 22 in a gapless state to form a strong joint therebetween.

Besides, the inner and outer joint portions 31A and 31B of the left fore leg 31 are each formed, in the shape of a flare tube which is gradually spread from the intermediate tubular portion 31C. Therefore, at the time of a welding, a longer welding bead can be formed around the inner joining end 31A1 of the inner joint portion 31A on the side of the center frame as well as around the outer joining end 31B1 of the outer joint portion 31B on the side of the side frame. Accordingly, it becomes possible to enhance the joint strength between the inner joint portion 31A and the center frame 12 as well as the joint strength between the outer joint portion 31B and the side frame 22.

Furthermore, both of the inner and outer joint portions 31A and 31B of the left fore leg 31 are formed by a casting means in the shape of a flare tube which is gradually spread from the intermediate tubular portion 31C, presenting a smooth and seamless sectional shape from the intermediate tubular portion 31C. These arrangements contribute to reduce stresses which will be exerted on joint portions between the center frame 12 and the left fore leg 31 and joint portions between the side frame 22 and the left fore leg 31, as a result enhancing the joint strength of the left fore leg 31.

Similarly, the inner and outer joint portions 32A and 32B of the left hind leg 32 are each formed in the shape of a flare tube by casting. Therefore, the inner joint portion 32A on the side of the center frame and the outer joint portion 32B on the side of the side frame can be fabricated with high precision. It follows that the inner joint portion 32A can be assembled to butt against the center frame 12 in a gapless state to form a strong joint therebetween. Similarly, the outer joint portion 32B can be assembled to butt against the right side wall 23C of the intermediate frame portion 23 of the side frame 22 and also to butt against the inner flange surface 25B of the rear connecting flange 25 in a gapless state to form a strong joint therebetween.

Besides, the inner joint portion 32A on the side of the center frame as well as the outer joint portion 32B on the side of the side frame of the left hind leg 32 is formed in the shape of a flare tube which is gradually spread from the intermediate tubular portion 32C. Therefore, at the time of a welding, it becomes possible to form a long welding bead not only around the joining end 32A1 of the inner joint portion 32A on the side of the center frame but also around the first and second outer joining ends 32B1 and 32B2 of the outer joint portion 32B on the side of the side frame, for enhancing the joint strength of the inner joint portion 32A with the center frame 12 and the joint strength of the outer joint portion 32B with the side frame 22 and the rear connecting flange 25.

In addition, the rear connecting flange 25 on the side of the motor bracket 27 is provided with the outer flange surface 25A to be welded to the rear end face of the intermediate frame portion 23, and the inner flange surface 25B extended toward the side of center frame 12. The second outer joining end 32B2 of the left hind leg 32 is joined with the inner flange surface 25B by welding. Thus, it becomes possible to increase the length of welding bead to a marked degree at the time of welding the second outer joining end 32B2 of the left hind leg 32 to the rear connecting flange 25, for enhancing the joint strength of the outer joint portion 32B all the more.

Moreover, the inner and outer joint portions 32A and 32B of the left hind leg 32 are formed by a casting means as a flare tube which is spread gradually from the intermediate tubular portion 32C, presenting a smooth and seamless sectional shape from the intermediate tubular portion 32C. These arrangements contribute to reduce stresses which will be exerted on joint portions between the center frame 12 and the left hind leg 32 and on joint portions between the side frame 22 and the left hind leg 32, as a result enhancing the joint strength of the left hind leg 32.

The right fore leg 33 and the right hind leg 34 which are connecting the center frame 12 with the right side frame 28 can produce the same effects as described above in reducing stresses in joint portions and enhancing the strength thereof.

In the above-described first embodiment of the invention, both of the inner and outer joint portions 31A and 31B of the left fore leg 31 are formed in the shape of a flare tube which is gradually spread from the intermediate tubular portion 31C (FIG. 9).

However, in this regard, the present invention is not limited to the particular arrangements shown. For example, there may be employed a left fore leg 31' as in a first modification shown in FIG. 11. In this case, only the inner joint portion 31A on the side of the center frame is formed in the shape of a flare tube while an outer joint portion 31B' on the side of the side frame is formed in a normal tubular shape having substantially the same diameter as the intermediate tubular portion 31C. The same leg construction is adopted for the left hind leg 32, right fore leg 33 and right hind leg 34.

Figure 12:
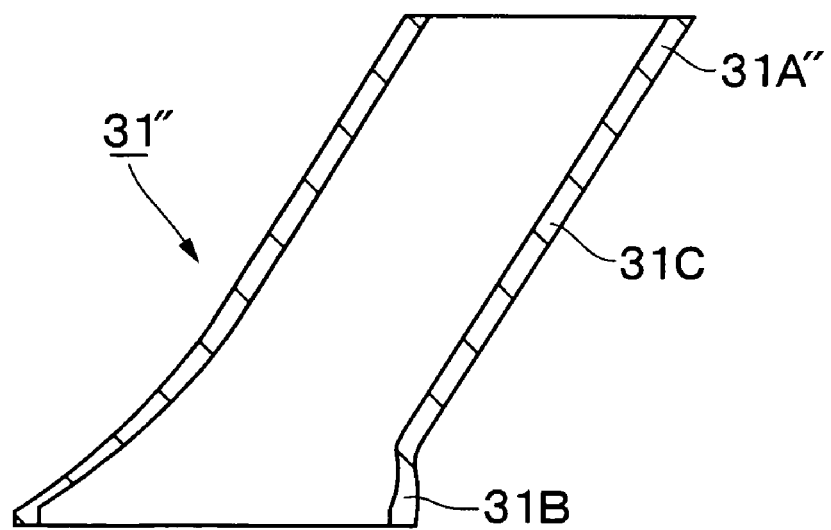
FIG. 12 is a sectional view similar to FIG. 9 but showing a second modification of the left fore leg alone.
Figure 13:
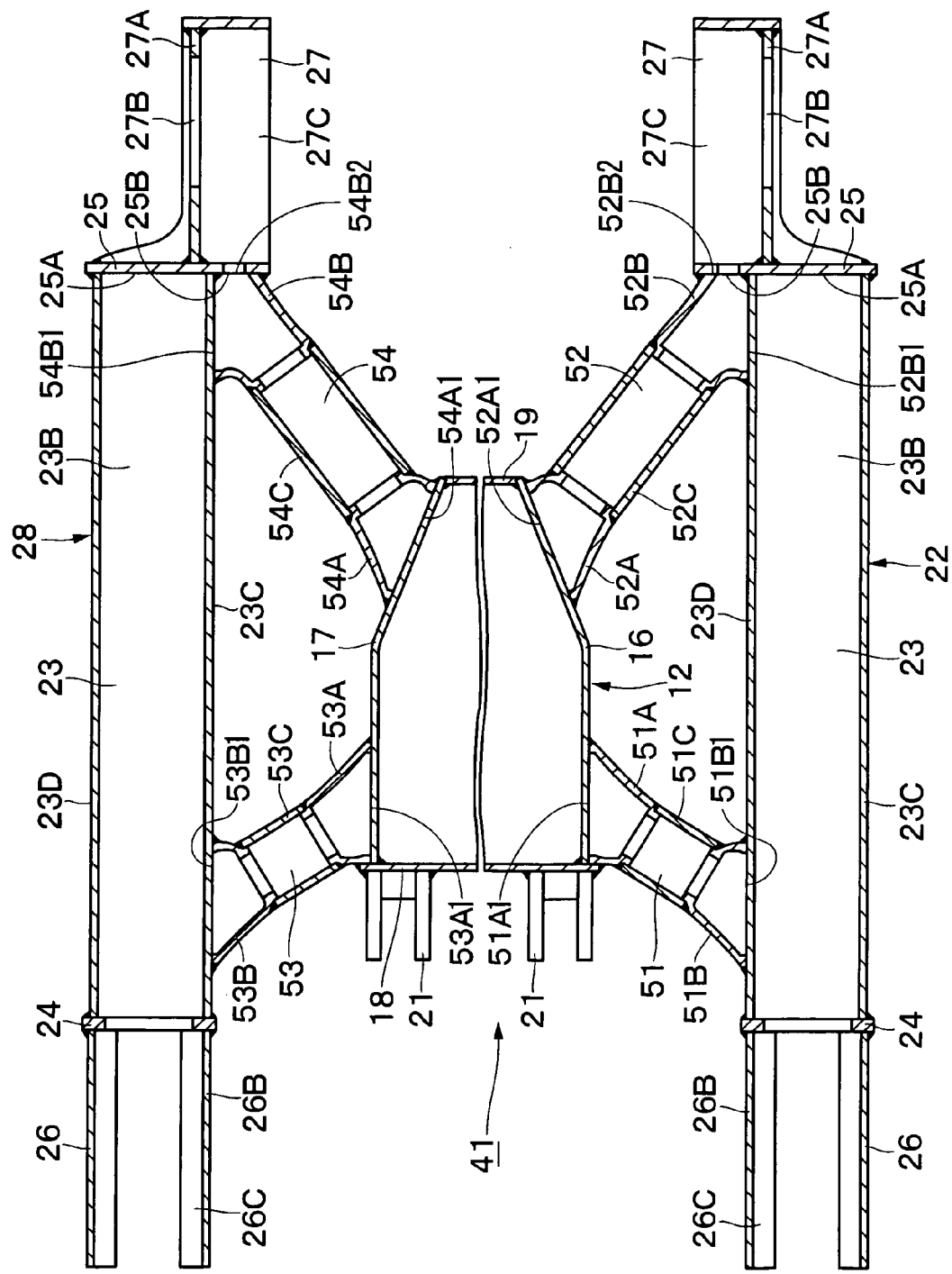
FIG. 13 is a horizontal sectional view similar to FIG. 6 but showing center frame, right and left side frames, left fore leg, left hind leg, right fore leg and right hind leg in a second embodiment of the present invention.

Alternatively, there may be employed a left fore leg 31" as in a second modification shown in FIG. 12. In this case, only the outer joint portion 31B on the side of the side frame is formed in the shape of a flare tube, while an inner joint portion 31A" on the side of the center frame is formed in a normal tubular shape having substantially the same diameter as the intermediate tubular portion 31C. The same leg construction is adopted for the left hind leg 32, right fore leg 33 and right hind leg 34.

Turning now to FIGS. 13 to 16, there is shown a second embodiment of the present invention. This embodiment has features in that each one of the legs is constituted by an unitary tubular structure which is formed by joining together inner and outer joint members and a tubular intermediate member. In the following description of the second embodiment, those component parts which are identical with the counterparts in the foregoing first embodiment are simply designated by identical reference numerals or characters to avoid repetitions of same explanations.

In the drawings, indicated at 41 is a truck frame which is adopted by the present embodiment in place of the truck frame 11 of the foregoing first embodiment. Similarly to the truck frame 11 in the first embodiment, the truck frame 41 is constituted by a center frame 12, a left side frame 22, a right side frame 28, a left fore leg 51, a left hind leg 52, a right fore leg 53 and a right hind leg 54, which will be described hereinafter. However, the legs 51 to 54 of the truck frame 41 of the present embodiment are fabricated in a different manner from the legs 31 to 34 of the foregoing first embodiment.

Figure 14:
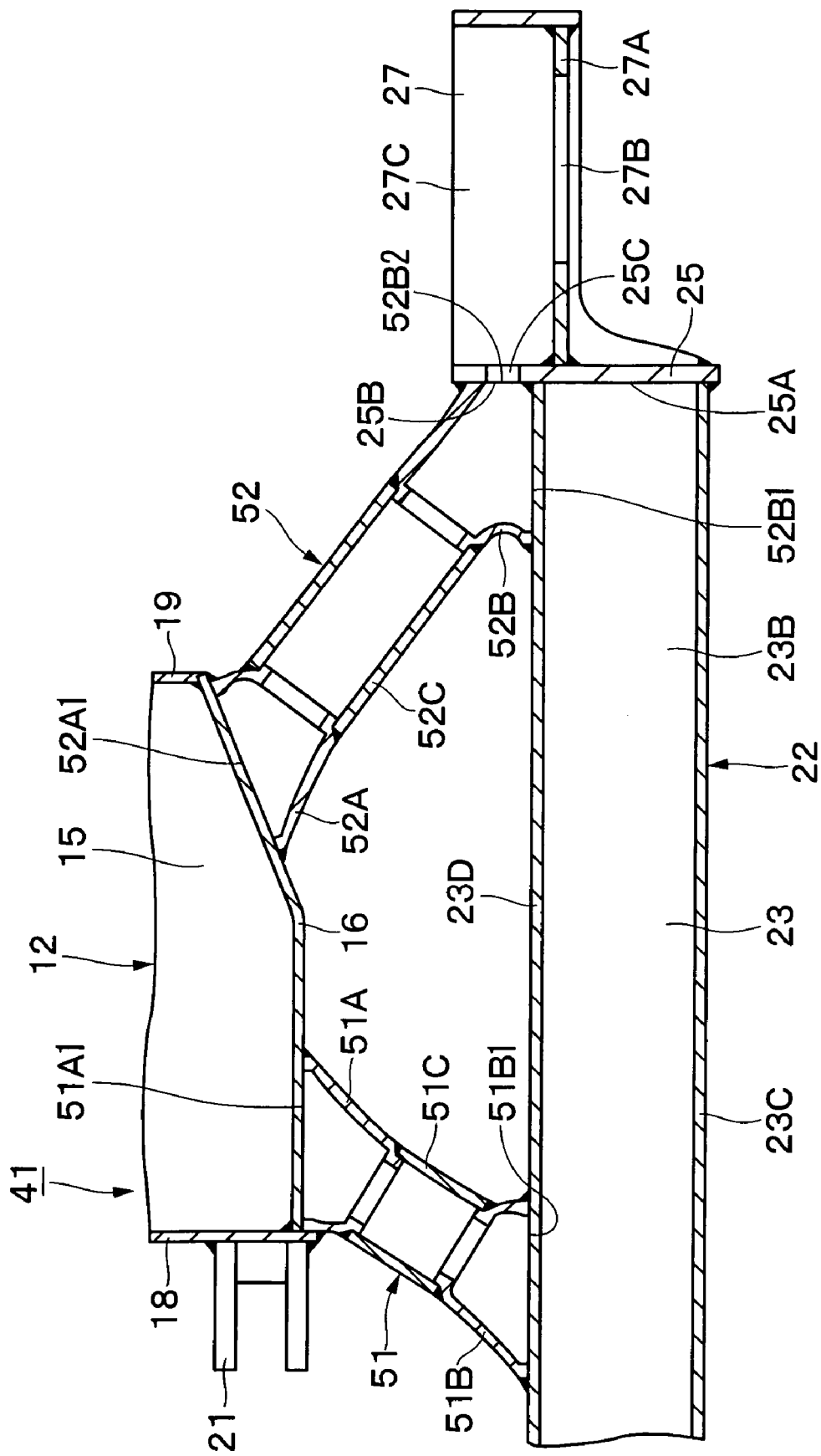
FIG. 14 is an enlarged horizontal sectional view showing the center frame, left side frame, left fore leg, left hind leg and motor bracket of FIG. 13 on an enlarged scale.
Figure 15:
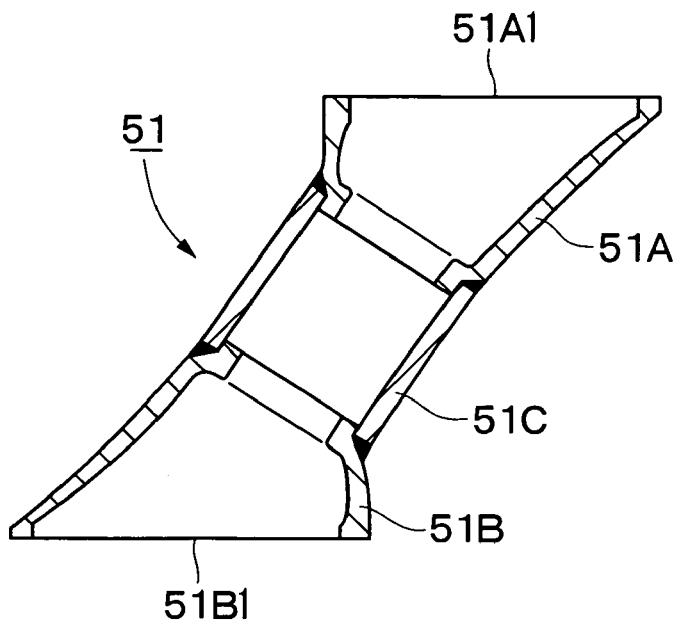
FIG. 15 is a sectional view showing the left fore leg of FIG. 14 alone.

Denoted at 51 is the left fore leg which is adopted by the present embodiment. As shown in FIGS. 14 and 15, the left fore leg 51 is constituted by an inner joint member 51A to be joined with the left side plate 16 of the center frame 12, an outer joint member 51B to be joined with the right side wall 23D of the side frame 22 (the intermediate frame portion 23), and an intermediate tubular member 51C between the inner joint member 51A on the side of the center frame and the outer joint member 51B on the side of the side frame, which are originally fabricated separately from each other. The left fore leg 51 is constituted by an unitary tubular structure which is formed by welding together the inner and outer joint members 51A and 51B and the intermediate tubular member 51C.

In this instance, the inner and outer joint members 51A and 51B are formed by a casting means using molten iron-base metal, for example, such as cast steel material, cast iron material and so forth. The intermediate tubular member 51C is formed by cutting a tubular steel pipe.

The inner joint member 51A on the side of the center frame is formed in the shape of a flare tube which is gradually spread from the intermediate tubular member 51C toward the inner joining end 51A1 (the open end on the side of the center frame 12). The open inner joining end 51A1 is formed in a rectangular shape which can be abutted against the left side plate 16 of the center frame 12 in a gapless state. Likewise, the outer joint member 51B on the side of the side frame is formed in the shape of a flare tube which is gradually spread from the intermediate tubular member 51C toward the outer joining end 51B1 (the open end on the side of the side frame 22), and the open outer joining end 51B1 is formed in a rectangular shape which can be abutted against the right side wall 23D of the side frame 22 (the intermediate frame portion 23) in a gapless state.

Figure 16:
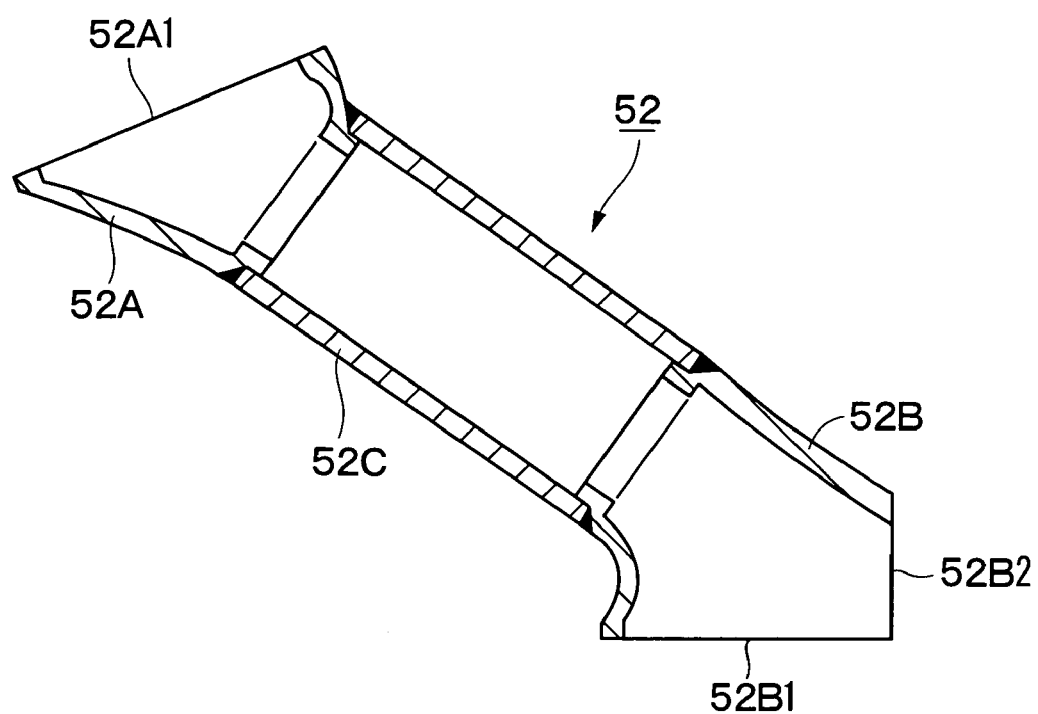
FIG. 16 is a sectional view showing the left hind leg of FIG. 14 alone.
Figure 17:
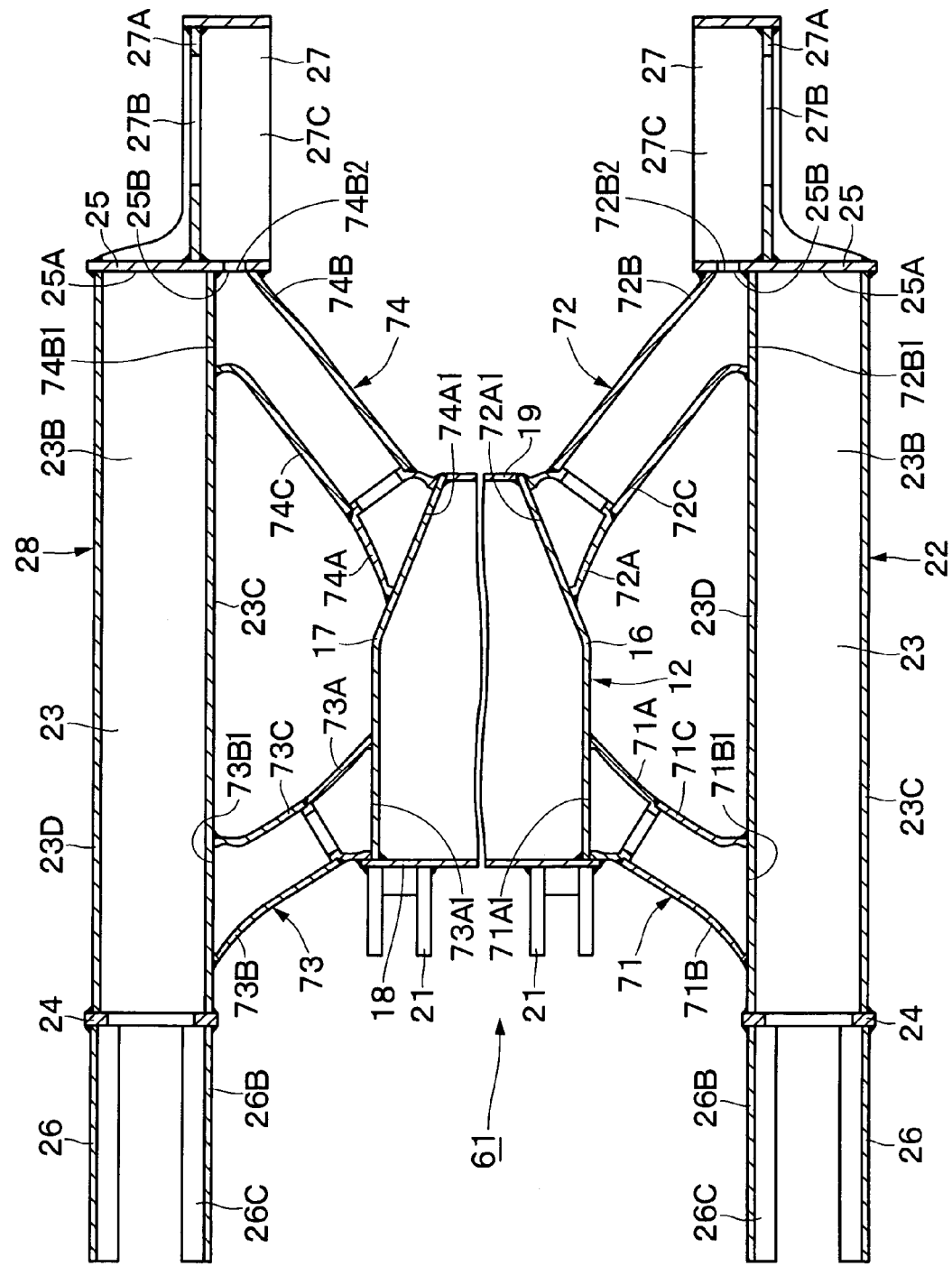
FIG. 17 is a horizontal sectional view similar to FIG. 6 but showing center frame, right and left side frames, left fore leg, left hind leg, right fore leg and right hind leg in a third embodiment of the present invention.

Indicated at 52 is a left hind leg which is adopted by the present embodiment. As shown in FIGS. 14 and 16, the left hind leg 52 is constituted by an inner joint member 52A to be joined with the left side plate 16 of the center frame 12, an outer joint member 52B to be joined with the right side wall 23D of the side frame 22 (the intermediate frame portion 23), and an intermediate tubular member 52C which is interposed between the inner joint member 52A on the side of the center frame and the outer joint member 52B on the side of the side frame, which are originally fabricated separately from each other. This left hind leg 52 is constituted by an unitary tubular structure which is formed by welding together the inner and outer joint members 52A and 52B and the intermediate tubular member 52C, which are originally separate from each other.

In this instance, the inner and outer joint members 52A and 52B are each formed by a casting means using molten iron-base metal, for example, such as cast steel material, cast iron material or the like. The intermediate tubular member 52C is prepared by cutting a tubular steel pipe.

The inner joint member 52A on the side of the center frame is formed in the shape of a flare tube which is gradually spread from the intermediate tubular member 52C toward an inner joining end 52A1 (the open end on the side of the center frame 12). The opening at the inner joining end 52A1 is formed in a rectangular shape which can be assembled to butt against the left side plate 16 of the center frame 12 in a gapless state. Likewise, the outer joint member 52B on the side of the side frame formed in the shape of a flare tube which is gradually spread from the intermediate tubular member 52C toward a first outer joining end 52B1 on the side of the side frame (the open end on the side of the side frame 22) and a second outer joining end 52B2 on the side of the connecting flange (the open end on the side of the rear connecting flange 25). In this particular embodiment, the first outer joining end 52B1 on the side of the side frame and the second outer joining end 52B2 on the side of the connecting flange are disposed at right angles relative to each other at the outer open end of the joint member. The first outer joining end 52B1 on the side of the side frame is abutted against the right side wall 23D of the intermediate frame portion 23 in a gapless state and joined with the right side wall 23D by welding. On the other hand, the second outer joining end 52B2 on the side of the connecting flange is abutted against the inner flange surface 25B of the rear connecting flange 25 in a gapless state, and welded to the inner flange surface 25B in such a way as to cover the hose passage hole 25C.

Denoted at 53 is a right fore leg which is adopted by the present embodiment. Similarly to the left fore leg 51, this right fore leg 53 is constituted by an unitary tubular structure which is formed by welding together inner and outer joint members 53A and 53B and an intermediate tubular member 53C, which are originally fabricated separately from each other. In this instance, the inner and outer joint members 53A and 53B are formed by a casting means using cast steel material, cast iron material or the like. The intermediate tubular member 53C is formed by cutting a tubular steel pipe.

The inner joint member 53A on the side of the center frame is formed in the shape of a flare tube which is gradually spread from the intermediate tubular member 53C toward an inner joining end 53A1. The opening at the inner joining end 53A1 is formed in a rectangular shape which can be assembled to butt against the right side plate 17 of the center frame 12. Likewise, the outer joint member 53B on the side of the side frame is formed in the shape of a flare tube which is gradually spread from the intermediate tubular member 53C toward an outer joining end 53B1. The opening at the outer joining end 53B1 is formed in a rectangular shape which can be assembled to butt against the left side wall 23C of the right side frame 28.

Indicated at 54 is a right hind leg which is adopted by the present embodiment. Similarly to the left hind leg 52, this right hind leg 54 is constituted by an unitary tubular structure which is formed by welding together inner and outer joint members 54A and 54B and an intermediate tubular member 54C, which are originally fabricated separately from each other. In the case of the present embodiment, the inner joint member 54A on the side of the center frame as well as the outer joint member 54B on the side of the side frame is formed by a casting means using cast steel material, cast iron material or the like. The intermediate tubular member 54C is prepared by cutting a tubular steel pipe.

The inner joint member 54A on the side of the center frame is formed in the shape of a flare tube which is gradually spread from the intermediate tubular member 54C toward an inner joining end 54A1. The opening at the inner joining end 54A1 is formed in a rectangular shape which can be assembled to butt against the right side plate 17 of the center frame 12. Likewise, the outer joint member 54B on the side of the side frame is formed in the shape of a flare tube which is gradually spread from the intermediate tubular member 54C toward a first outer joining end 54B1 on the side of the side frame and a second outer joining end 54B2 on the side of the connecting flange. In this instance, the first outer joining end 54B1 on the side of the side frame and the second outer joining end 54B2 on the side of the connecting flange are disposed at right angles relative to each other at the outer open end. The first outer joining end 54B1 on the side of the side frame is arranged to butt against the left side wall 23C of the intermediate frame portion 23 in a gapless state, and joined with the left side wall 23C by welding. On the other hand, the second outer joining end 54B2 on the side of the connecting flange is arranged to butt against the inner flange surface 25B of the rear connecting flange 25 in a gapless state, and welded to the inner flange surface 25B in such a way as to cover the hose passage hole 25C.

Being arranged in the manner as described above, the truck frame 41 for a hydraulic power shovel according to the present embodiment of the invention can produce substantially the same following operational effects as the truck frame 11 in the above-described first embodiment.

Besides, according to the present embodiment, the left fore leg 51 is constituted by an unitary tubular structure which is obtained by welding together the inner and outer joint members 51A and 51B, which are separately cast to shape by a casting means, and the intermediate tubular member 51C which is cut from a commercially available steel pipe.

Thus, the inner joint member 51A on the side of the center frame and the outer joint member 51B on the side of the side frame can be fabricated as separate units. This means that the inner and outer joint members 51A and 51B can be cast by the use of small low-cost molds to reduce the production cost of the left fore leg 51. The same applies to the left hind leg 52, right fore leg 53 and right hind leg 54.

Turning now to FIGS. 17 to 20, there is shown a third embodiment of the present invention. This embodiment has features in that legs are each constituted by an unitary tubular structure which is fabricated by integrally joining inner and outer joint members with an intermediate tubular member. In the following description of the third embodiment, those component parts which are identical with counterparts in the foregoing first embodiment are simply designated by identical reference numerals or characters to avoid repetitions of same explanations.

In the drawings, indicated at 61 is a truck frame which is adopted by the present embodiment in place of the truck frame 11 of the first embodiment. Similarly to the counterpart in the first embodiment, this truck frame 61 is constituted by a center frame 12, a left side frame 22, a right side frame 28, a left fore leg 71, a left hind leg 72, a right fore leg 73 and a right hind leg 74. However, the truck frame 61 according to the present embodiment is provided with the legs 71 to 74 which are fabricated in a different manner from the legs 31 to 34 in the above-described first embodiment.

Figure 18:
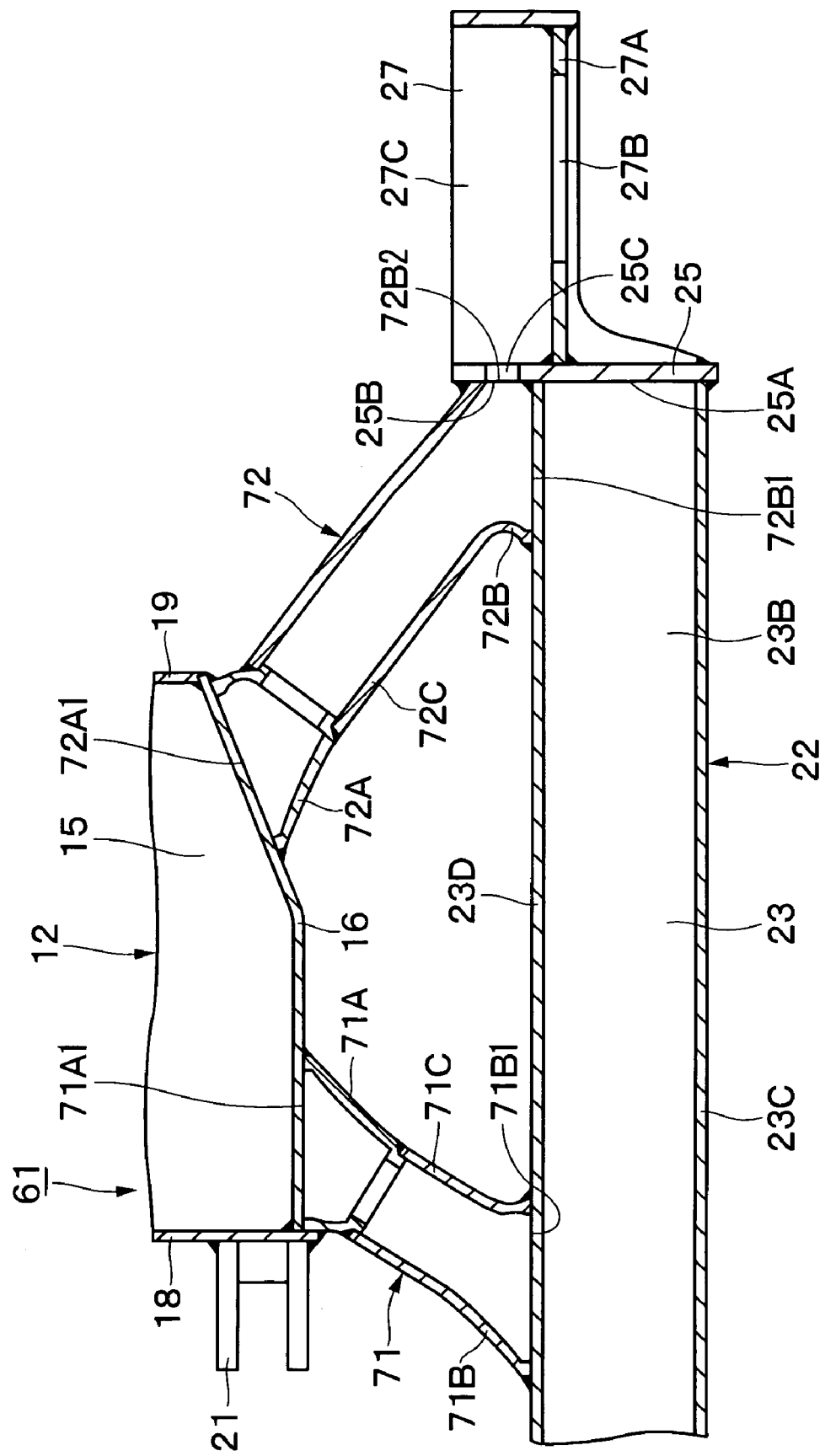
FIG. 18 is an enlarged horizontal sectional view showing the center frame, left side frame, left fore leg, left hind leg and motor bracket of FIG. 17 on an enlarged scale.
Figure 19:
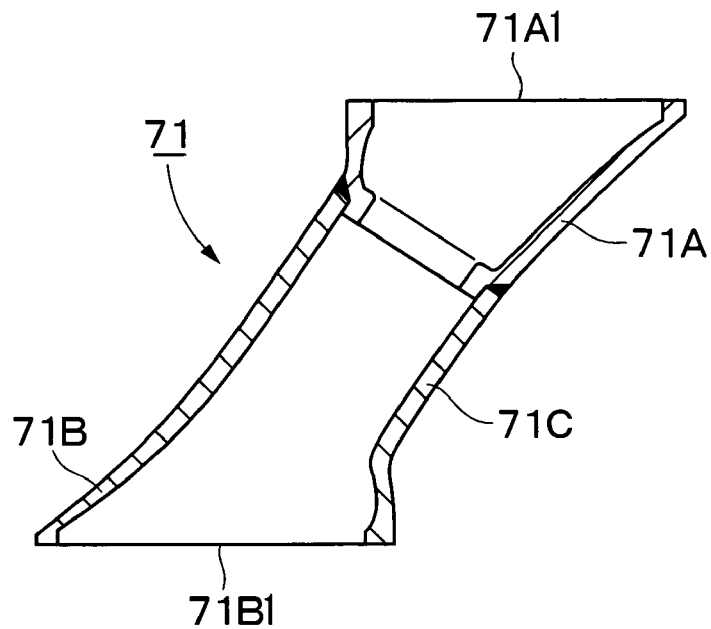
FIG. 19 is a sectional view showing the left fore leg of FIG. 18 alone.

Indicated at 71 is the left fore leg which is adopted by the present embodiment. As shown in FIGS. 18 and 19, the left fore leg 71 is constituted by an inner joint member 71A to be joined with the left side plate 16 of the center frame 12, and an outer joint member 71B to be joined with the right side wall 23D of the side frame 22, which are originally fabricated separately from each other. The inner and outer joint members 71A and 71B are prepared separately and joined together by welding afterwards to provide an unitary tubular structure for the left fore leg 71, having an intermediate tubular portion 71C in a longitudinally intermediate position between the inner and outer joint portions 71A and 71B.

In this particular embodiment, the inner joint member 71A on the side of the center frame is formed by a casting means using molten iron-base metal, for example, such as cast steel material, cast iron material or the like, in the shape of a flare tube which is gradually spread from the intermediate tubular portion 71C toward an inner joining end 71A1. The opening at the inner joining end 71A1 is formed in a rectangular shape which can be assembled to butt against the left side plate 16 of the center frame 12.

On the other hand, the outer joint member 71B on the side of the side frame is formed by a casting means using molten iron-base metal, for example, such as cast steel material, cast iron material or the like. And the outer joint member 71B is formed in the shape of a flare tube which is integrally formed with an intermediate tubular portion 71C, and which is gradually spread from the intermediate tubular portion 71C toward an outer joining end 71B1. The intermediate tubular portion 71C which is provided integrally with the outer joint member 71B on the side of the left side member is joined with the inner joint member 71A on the side of the center frame, while the open outer joining end 71B1 is formed in a rectangular shape which is arranged to butt against the right side wall 23D of the side frame 22.

Figure 20:
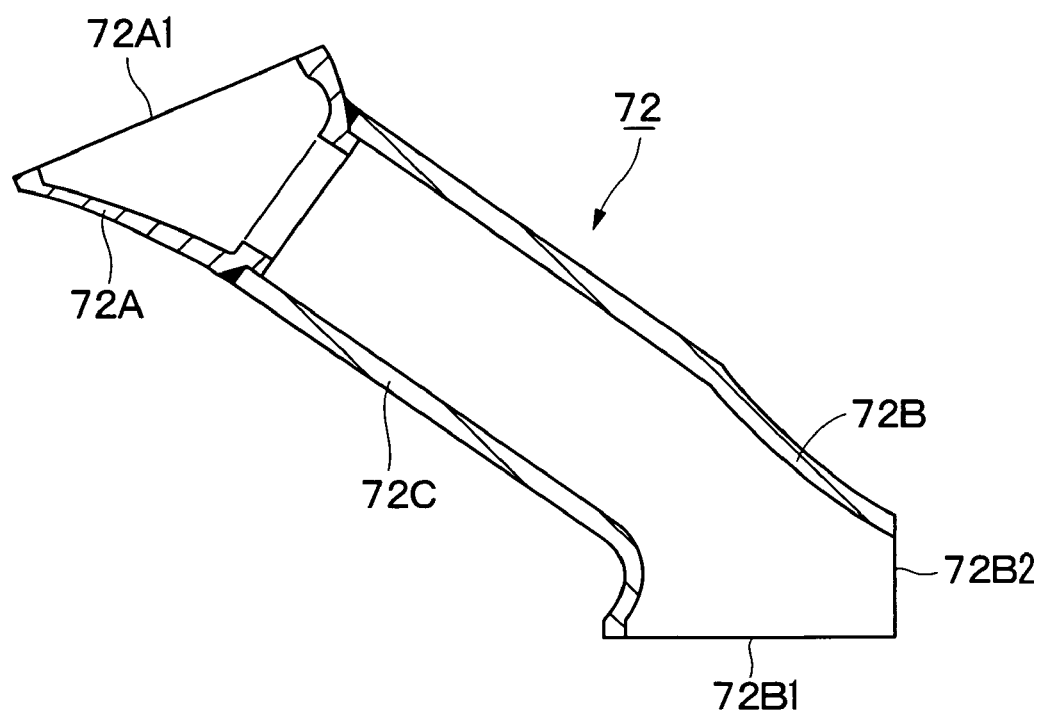
FIG. 20 is a sectional view showing the left hind leg of FIG. 18 alone.
Figure 21:
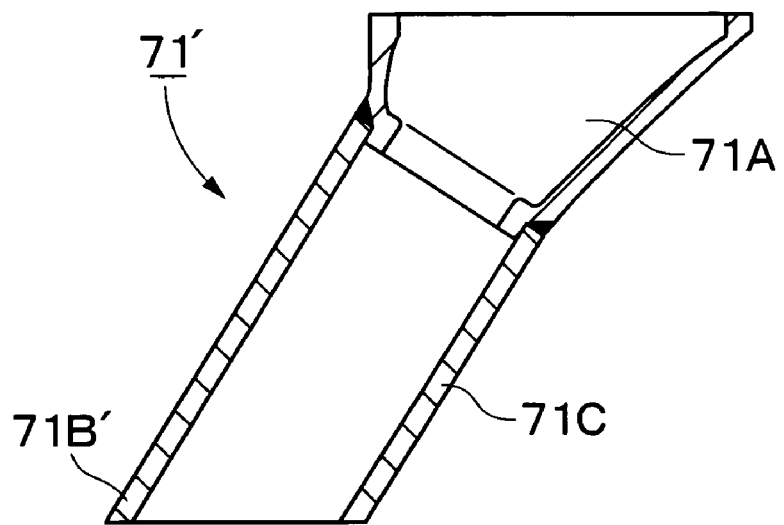
FIG. 21 is a sectional view showing a third modification of the left fore leg alone.
Figure 23:
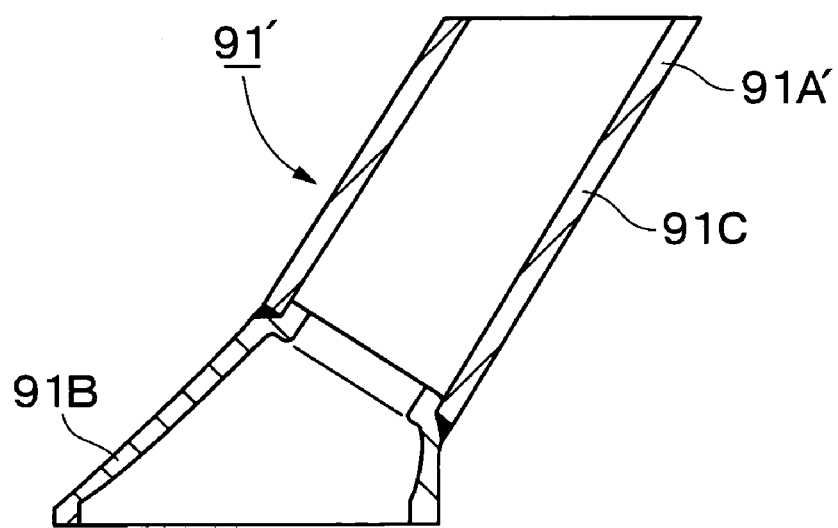
FIG. 23 is a sectional view showing the left fore leg of the fourth embodiment alone.

Indicated at 72 is the left hind leg which is adopted by the present embodiment. As shown in FIGS. 18 and 20, the left hind leg 72 is constituted by an inner joint member 72A to be joined with the left side plate 16 of the center frame 12, and an outer joint member 72B to be joined with the right side wall 23D of the left side frame 22 and the inner flange surface 25B of the rear connecting flange 25. The left hind leg 72 has an unitary tubular body which is formed by welding together the inner and outer joint members 72A and 72B which are initially prepared separately. An intermediate tubular portion 72C is provided integrally in a longitudinally intermediate position between the inner and outer joint members 72A and 72B.

In this instance, the inner joint member 72A on the side of the center frame is formed by a casting means using a molten iron-base metal, for example, such as cast steel material, cast iron material or the like. And the inner joint member 72A is formed in the shape of a flare tube which is gradually spread from the intermediate tubular portion 72C toward an inner joining end 72A1. The opening at the inner joining end 72A1 is formed in a rectangular shape which is arranged to butt against the left side plate 16 of the center frame 12.

On the other hand, the outer joint member 72B on the side of the side frame is similarly formed by a casting means using a molten iron-base metal, for example, such as cast steel material, cast iron material or the like. And the outer joint member 72B is formed in the shape of a flare tube which is integrally formed with an intermediate tubular portion 72C, and which is gradually spread from the intermediate tubular portion 72C toward a first outer joining end 72B1 and a second outer joining end 72B2. The opening at the first and second outer joining ends 72B1 and 72B2 are disposed at right angles relative to each other. The intermediate tubular portion 72C which is provided integrally with the outer joint member 72B on the side of the side frame is integrally joined with the inner joint member 72A on the side of the center frame. Further, the first outer joining end 72B1 on the side of the side frame is arranged to butt against and welded to the right side wall 23D of the intermediate frame portion 23 in a gapless state. On the other hand, the second outer joining end 72B2 on the side of the connecting flange is arranged to butt against and welded to the inner flange surface 25B in a gapless state, in such a way as to cover the hose passage hole 25C.

Indicated at 73 is a right fore leg which is adopted by the present embodiment. Similarly to the left fore leg 71, the right fore leg 73 has an unitary tubular body which is formed by joining together an inner joint member 73A on the side of the center frame and an outer joint member 73B on the side of the side frame, in such a way as to provide an intermediate tubular portion 73C in a longitudinally intermediate position between the inner and outer joint members 73A and 73B.

The inner joint member 73A is formed in the shape of a flare tube which is gradually spread from the intermediate tubular portion 73C toward an inner joining end 73A1. The opening at the inner joining end 73A1 is formed in a rectangular shape and arranged to butt against the right side plate 17 of the center frame 12.

On the other hand, the outer joint member 73B on the side of the side frame is formed in the shape of a flare tube which is integrally formed with an intermediate tubular portion 73C at one end, and which is gradually spread at the other end from the intermediate tubular portion 73C toward an outer joining end 73B1. The opening at the outer joining end 73B1 is formed in a rectangular shape and arranged to butt against the left side wall 23C of the side frame 22.

Indicated at 74 is a right hind leg which is adopted by the present embodiment. Similarly to the left hind leg 72, this right hind leg 74 has an unitary tubular body which is formed by joining together an inner joint member 74A on the side of the center frame and an outer joint member 74B, in such a way as to provide an intermediate tubular portion 74C in a longitudinally intermediate position between the inner and outer joint members 74A and 74B.

The inner joint member 74A on the side of the center frame is formed in the shape of a flare tube which is gradually spread from the intermediate tubular portion 74C toward an inner joining end 74A1. The opening at the inner joining end 74A1 is formed in a rectangular shape and arranged to butt against the right side plate 17 of the center frame 12.

On the other hand, the outer joint member 74B on the side of the side frame is formed in the shape of a flare tube which is formed with an intermediate tubular portion 74C integrally at one end, and which is gradually spread at the other end from the intermediate tubular portion 74C toward a first outer joining end 74B1 on the side of the side frame and a second outer joining end 74B2 on the side of the connecting flange. In this instance, the opening at the first and second outer joining ends 74B1 and 74B2 are disposed at right angles relative to each other. The intermediate tubular portion 74C which is provided integrally with the outer joint member 74B on the side of the side frame is joined with the inner joint member 74A on the side of the center frame.

Further, the first outer joining end 74B1 is abutted against the left side wall 23C of the intermediate frame portion 23 in a gapless state, and joined with the left side wall 23C by welding. On the other hand, the second outer joining end 74B2 on the side of the connecting flange is abutted against the inner flange surface 25B of the rear connecting flange 25 in a gapless state, and joined with the inner flange surface 25B by welding in such a way as to cover the hose passage hole 25C.

Being arranged in the manner as described above, the truck frame 61 of the present embodiment can produce substantially the same operational effects as the truck frame 11 of the first embodiment.

Besides, according to the present embodiment, the inner and outer joint members 71A and 71B are initially fabricated separately by the use of a casting means, and then joined them together to provide an unitary tubular body for the left fore leg 71.

Therefore, the inner joint member 71A on the side of the center frame as well as the outer joint member 71B on the side of the side frame can be fabricated separately as a unit of a small size. This means that the inner and outer joint members 71A and 71B can be cast by the use of inexpensive molds of a small size for the purpose of cutting the production of the left fore leg 71. The same arrangements can be applied similarly to the left hind leg 72, right fore leg 73 and right hind leg 74.

In the case of the third embodiment described above, the inner and outer joint members 71A and 71B of the left fore leg 71 are each formed in the shape of a flare tube which is spread gradually from the intermediate tubular portion 71C (see FIG. 19).

However, in this regard, the present invention is not limited to the particular forms shown. For example, the left fore leg 71' which is shown as a third modification in FIG. 21. More particularly, in this case, the inner joint member 71A alone is formed in the shape of a flare tube, while an outer joint member 71B' on the side of the side frame is formed in a straight tubular shape having substantially the same diameter as the intermediate tubular portion 71C. The same arrangements can be applied similarly to the left hind leg 72, right fore leg 73 and right hind leg 74.

Figure 22:
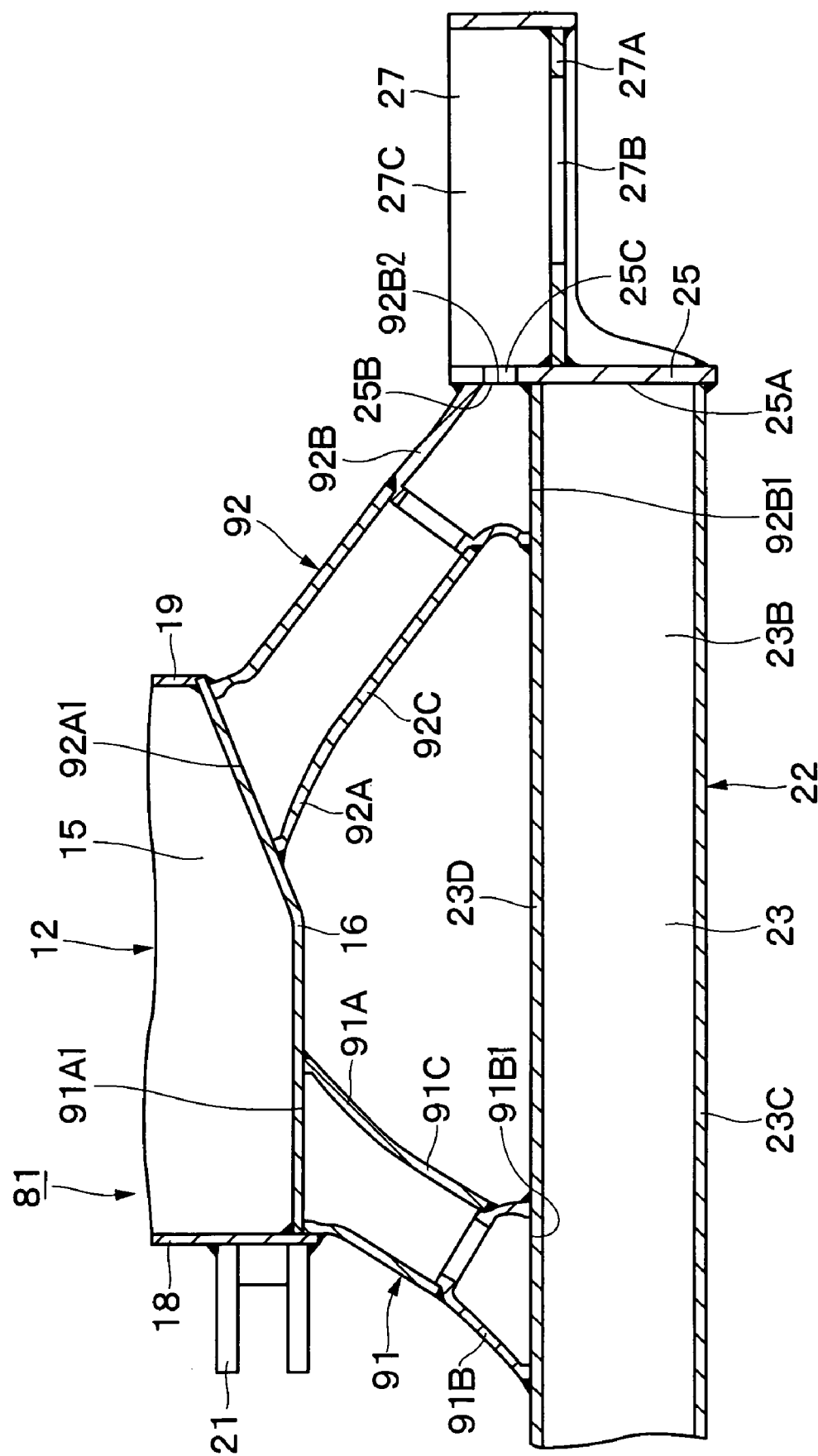
FIG. 22 is an enlarged horizontal sectional view showing on an enlarged scale center frame, left side frame, left fore leg, left hind leg and motor bracket in a fourth embodiment of the present invention.

Now, turning to FIG. 22, there is shown a fourth embodiment of the present invention. This embodiment has features in that the legs have an unitary tubular body which is formed by joining together an inner joint member on the side of the center frame and an outer joint member on the side of the side frame, in such a way as to provide an intermediate tubular portion integrally with the inner joint member on the side of the center frame. In the following description of the fourth embodiment, those component parts which are identical with counterparts in the foregoing first embodiment are simply designated by identical reference numerals or characters to avoid repetitions of same explanations.

In the drawings, indicated at 81 is a truck frame which is adopted by the present embodiment. This truck frame 81 is constituted by a center frame 12, a left side frame 22, a right side frame (not shown), a left fore leg 91 which will be described in greater detail hereinafter, a left hind leg 92, a right fore leg and a right hind leg (which are omitted in the drawing).

Indicated at 91 is the left fore leg adopted by the present embodiment. This left fore leg 91 is constituted by two originally separate members, i.e., an inner joint member 91A to be joined with the left side plate 16 of the center frame 12 and an outer joint member 91B to be joined with the right side wall 23D of the side frame 22. Namely, the left fore leg 91 has an unitary tubular body which is formed by welding together the inner joint member 91A on the side of the center frame and the outer joint member 91B on the side of the side frame in such a way as to provide an intermediate tubular portion 91C in a longitudinally intermediate position between inner and outer joint members 91A and 91B.

In this instance, the inner joint member 91A on the side of the center frame is formed by a casting means, in the shape of a flare tube which is formed with the intermediate tubular portion 91C integrally at one end and which is gradually spread in a direction away from the intermediate tubular portion 91C toward an inner joining end 91A1. On the other hand, the outer joint member 91B on the side of the side frame is formed by a casting means, in the shape of a flare tube which is gradually spread in a direction away from the intermediate tubular portion 91C toward an outer joining end 91B1.

Denoted at 92 is the left hind leg which is adopted by the present embodiment. This left hind leg 92 is constituted by two originally separate members, i.e., an inner joint member 92A to be joined with the left side plate 16 of the center frame 12 and an outer joint member 92B to be joined with the right side wall 23D of the side frame 22. Namely, the left hind leg 92 has an unitary tubular body which is formed by welding together the inner joint member 92A on the side of the center frame and the outer joint member 92B on the side of the side frame in such a way as to provide an intermediate tubular portion 92C in an intermediate position between the inner and outer joint members 92A and 92B.

In this instance, the inner joint member 92A on the side of the center frame is formed by a casting means, in the shape of a flare tube which is integrally formed with the intermediate tubular portion 92C at one end and which is gradually spread in the direction away from the intermediate tubular portion 92C toward an inner joining end 92A1. On the other hand, the outer joint member 92B on the side of the side frame is formed by a casting means, in the shape of a flare tube which is gradually spread in a direction away from the intermediate tubular portion 92C toward a first outer joining end 92B1 on the side of the side frame and a second outer joining end 92B2 on the side of the connecting flange.

The right fore leg and the right hind leg which are connected between the center frame 12 and the right side frame are arranged in the same way as the above-described left fore leg 91 and the left hind leg 92, respectively.

Being arranged in the manner as described above, the truck frame 81 of the present embodiment can produce substantially the same operational effects as the truck frame 61 of the foregoing third embodiment.

In the above-described fourth embodiment of the invention, the inner and outer joint members 91A and 91B of the left fore leg 91 are each formed in the shape of a flare tube which is gradually spread in a direction away from the intermediate tubular portion 91C.

However, in this regard, the present invention is not limited to the particular forms shown in the drawing. For example, it is possible to employ a left fore leg 91' which is shown as a fourth modification in FIG. 23. In this case, the outer joint member 91B alone is formed in the shape of a flare tube, while an inner joint member 91A' on the side of the center frame is formed in the shape of a straight tubular shape having substantially the same diameter as the intermediate tubular portion 91C. The same arrangements are similarly applied to the left hind leg 92, the right fore leg 93 and right hind leg 94.

Figure 24:
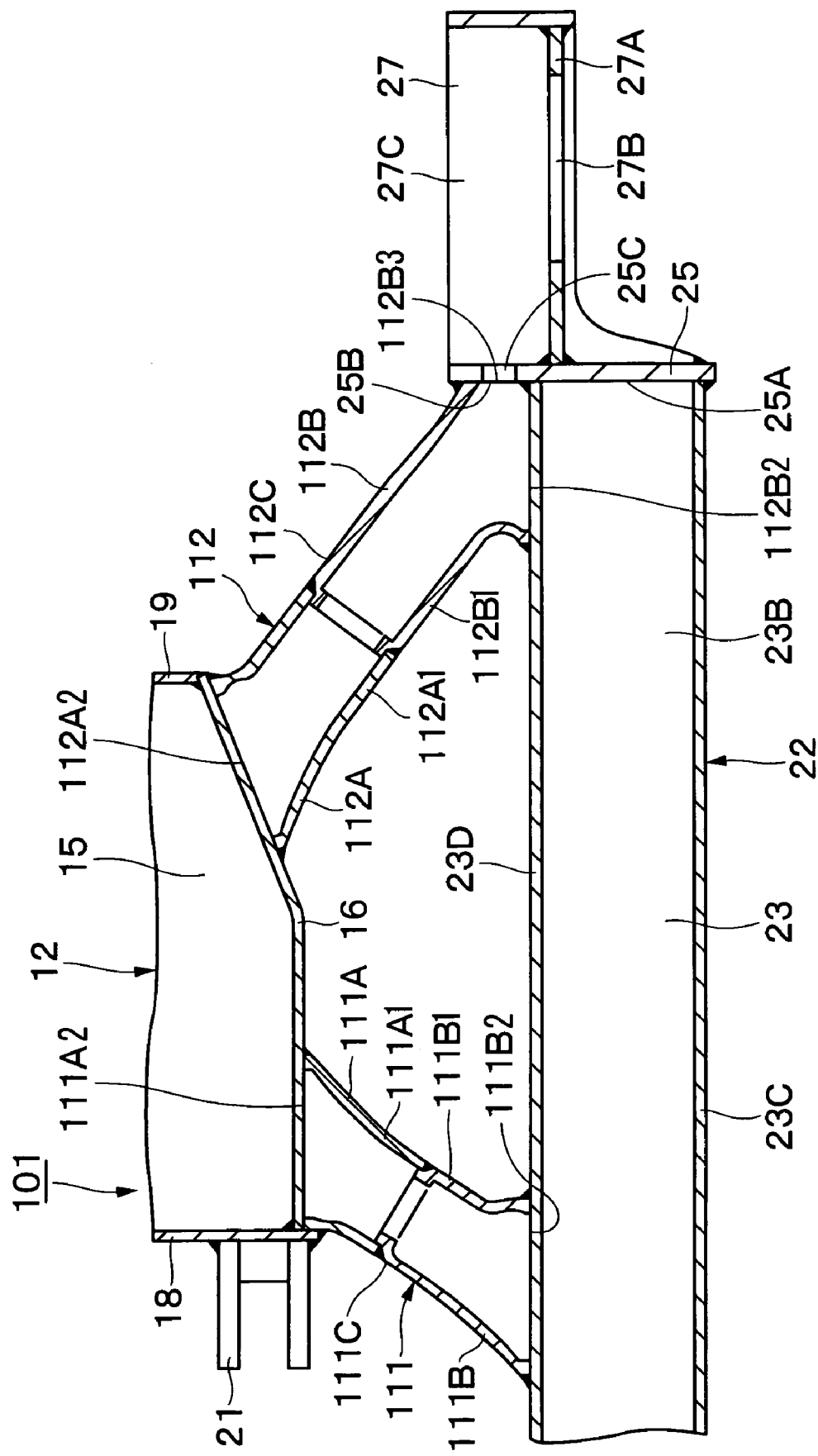
FIG. 24 an enlarged horizontal sectional view showing on an enlarged scale center frame, left side frame, left fore leg, left hind leg and motor bracket in a fifth embodiment according to the present invention.

Now, turning to FIG. 24, there is shown a fifth embodiment of the present invention. This embodiment has features in that the legs have an unitary tubular body which is formed by joining together two joint members, i.e., an inner joint member on the side of the center frame and an outer joint member on the side of the side frame, and a part of an intermediate tubular portion is formed integrally with the inner joint member on the side of the center frame while the other part of the intermediate tubular portion is formed integrally with the outer joint member on the side of the side frame. In the following description of the fifth embodiment, those component parts which are identical with the counterparts in the foregoing first embodiment are simply designated by identical reference numerals or characters to avoid repetitions of same explanations.

In FIG. 24, indicated at 101 is a truck frame which is adopted by the present embodiment. This truck frame 101 is constituted by a center frame 12, a left side frame 22, a right side frame (not shown), a left fore leg 111 and a left hind leg 112 which will be described hereinafter, a right fore leg and a right hind leg (both not shown).

Designated at 111 is the left fore leg which is adopted by the present embodiment. This left fore leg is constituted by two originally separate members, i.e., an inner joint member 111A to be joined with the left side plate 16 of the center frame 12 and an outer joint member 111B to be joined with the right side wall 23D of the side frame 22. Namely, the left fore leg 111 has an unitary tubular body which is formed by welding to each other the inner joint member 111A on the side of the center frame and the outer joint member 111B on the side of the side frame, in such a way as to provide an intermediate tubular portion 111C in a longitudinally intermediate position between the inner and outer joint members 111A and 111B.

In this instance, the inner joint member 111A on the side of the center frame 12 is formed by a casting means, in the shape of a flare tube which is formed with one part 111A1 of an intermediate tubular portion 111C on the side of the center frame integrally at one end thereof and which is gradually spread from the partial intermediate tubular portion 111A1 toward an inner joining end 111A2.

On the other hand, the outer joint member 111B on the side of the side frame is formed by a casting means, in the shape of a flare tube which is formed with the other part 111B1 of an intermediate tubular portion 111C on the side of the side frame integrally at one end thereof and which is gradually spread from the partial intermediate tubular portion 111B1 toward an outer joining end 111B2.

Namely, the left fore leg 111 is formed by joining together the partial intermediate tubular portion 111A1 of the inner joint member 111A on the side of the center frame and the partial intermediate tubular portion 111B1 of the outer joint member 111B on the side of the side frame to provide the intermediate tubular portion 111C in a longitudinally intermediate position between the inner and outer joint members 111A and 111B.

Indicated at 112 is the left hind leg which is adopted by the present embodiment. This left hind leg 112 is constituted by two originally separate members, i.e., an inner joint member 112A to be joined with the left side plate 16 of the center frame 12 and an outer joint member 112B to be joined with the right side wall 23D of the side frame 22. Namely, the left hind leg 112 has an unitary tubular body which is formed by welding to each other the inner joint member 112A on the side of the center frame and the outer joint member 112B on the side of the side frame, providing an intermediate tubular portion 112C in a longitudinally intermediate position between the inner and outer joint members 112A and 112B.

In this instance, the inner joint member 112A on the side of the center frame is formed by a casting means, in the shape of a flare tube which is formed with one part 112A1 of the intermediate tubular portion 112C integrally at one end thereof and which is gradually spread from the partial intermediate tubular portion 112A1 toward an inner joining end 112A2.

On the other hand, the outer joint member 112B on the side of the side frame is formed by a casting means, in the shape of a flare tube which is formed with the other part 112B1 of the intermediate tubular portion 112C integrally at one end thereof and which is gradually spread from the partial intermediate tubular portion 112B1 toward a first outer joining end 112B2 on the side of the side frame and a second outer joining end 112B3 on the side of the rear connecting flange.

The left hind leg 112 is formed by joining together the partial intermediate tubular portion 112A1 on the side of the inner joint member 112A and the partial intermediate tubular portion 112B1 on the side of the outer joint member 112B, thereby providing the intermediate tubular portion 112C in a longitudinally intermediate position between the inner and outer joint members 112A and 112B.

The right fore leg and the right hind leg on the right side of the side frame joined to the center frame 12 are arranged in the same as the above-described left fore leg 111 and the left hind leg 112, respectively.

Being arranged in the manner as described above, the truck frame 101 of the present embodiment can produce substantially the same operational effects as the truck frame 61 of the foregoing third embodiment.

In the foregoing embodiments, the present invention has been described by way of example in connection with a cab type hydraulic excavator having a cab 9 on an upper structure 6. However, it is to be understood that the present invention is not limited to the particular example shown, and can be applied to other types of excavator including a canopy type excavator which has a canopy over an operator's seat.

Further, the application of the present invention is not limited to a truck frame on a lower structure of a hydraulic excavator. Namely, the present invention can be similarly applied to lower structures of other construction machines, for example, to lower structures of hydraulic cranes.

The invention claimed is:

1. A truck frame for a construction machine, said truck frame including a center frame for supporting an upper structure, right and left side frames extending toward and between fore and rear ends of right and left sides of said center frame, respectively, right and left fore legs provided on the right and left sides of said center frame, respectively, to connect said right and left side frames to right and left sides of said center frame, respectively, and right and left hind legs provided on said right and left sides of said center frame, respectively, to connect said right and left side frames to said right and left sides of said center frame, respectively, characterized in that:

each of said fore and hind legs is constituted by an inner joint portion joined with said center frame by welding, an outer joint portion joined with a respective one of said side frames by welding, and an intermediate tubular portion provided between said inner and outer joint portions;

each of said inner joint portions and each of said outer joint portions is constituted by a flare tube gradually increasing in diameter from said intermediate tubular portion toward a joining end portion thereof;

said joining end portions of each of said inner joint portions and each of said outer joint portions being an open end of a substantially rectangular shape; and said flare tube is formed by casting using molten iron-base metal.

2. A truck frame for a construction machine as defined in claim 1, wherein said legs are each constituted by a unitary tubular structure formed by casting said inner and outer joint portions integrally along with said intermediate tubular portion.

3. A truck frame for a construction machine as defined in claim 1, wherein said legs are each constituted by a unitary tubular structure formed by joining together three members, including an inner joint member for said inner joint portion on the side of said center frame, an outer joint member for said outer joint portion on the side of either one of said side frames, and an intermediate tubular member for said intermediate tubular portion.

4. A truck frame for a construction machine as defined in claim 1, wherein said legs are each constituted by a unitary tubular structure formed by joining together an inner joint member for said inner joint portion on the side of said center frame and an outer joint member for said outer joint portion on the side of either one of said side frames in such a way as to provide said intermediate tubular portion in a longitudinally intermediate position between said inner and outer joint portions.

5. A truck frame for a construction machine as defined in claim 4, wherein said intermediate tubular portion is formed integrally on said flare tube for said outer joint member on the side of said side frame.

6. A truck frame for a construction machine as defined in claim 4, wherein said intermediate tubular portion is formed integrally on said flare tube for said inner joint member on the side of said center frame.

7. A truck frame for a construction machine as defined in claim 4, wherein said intermediate tubular portion is formed partly with a partial intermediate tubular portion on said inner joint member and partly with a partial intermediate tubular portion on said outer joint member.

8. A truck frame for a construction machine as defined in claim 1, wherein each of one of said side frames includes an intermediate frame portion extending towards fore and rear ends thereof, an idle wheel bracket provided at one longitudinal end of said intermediate frame portion, a motor bracket provided at the other longitudinal end of said intermediate frame portion, and a rear connecting flange provided between said other longitudinal end face of said intermediate frame portion and said motor bracket to join these parts together;

each one of said hind legs is extended obliquely in a rearward direction, and said flare tube of said outer joint portion of each of said right and left hind legs is adapted to be joined with part of said rear end portion of said intermediate frame portion and part of said rear connecting flange of said right and left side frames, respectively.

9. A truck frame for a construction machine as defined in claim 8, wherein said rear connecting flange is provided with an inner flange projecting inward of said side frame toward said center frame, and said flare tube of said outer joint portion of each of said right and left hind legs is adapted to be joined partly with a rear end portion of said intermediate frame portion and partly with said inner flange of said rear connecting flange of said right and left side frames, respectively.

10. A truck frame for a construction machine as defined in claim 8, wherein said flare tube of said outer joint portion of each of said right and left hind legs is provided with a first outer joining end joined with a rear end portion of said intermediate frame portion of said right and left side frames, respectively, and a second outer joining end joined with said rear connecting flange, said first and second outer joining ends being disposed substantially at right angles relative to each other at an outer end of said flare tube;

said rear connecting flange being provided with an outer flange surface in confronting relation with a rear end face of said respective side frame and an inner flange surface projected inward from said outer flange surface toward said center frame;

said outer flange surface of said rear connecting flange is joined with a rear end of said intermediate frame portion of said respective side frame; and said inner flange surface of said rear connecting flange is joined with the second outer joining end of said flare tube.

11. A truck frame for a construction machine as defined in claim 8, wherein said right and left fore legs are each extended obliquely in a forward direction from said center frame, and said outer joint portion of each fore leg is joined with said intermediate frame portion of said side frame thereof by welding.

* * * * *